United States Patent [19]

Miyasaka

[11] Patent Number: 4,745,428

[45] Date of Patent: May 17, 1988

[54] METHOD OF AND APPARATUS FOR ESTABLISHING A PROGRAMMABLE EXPOSURE RESPONSE OF CAMERA

[75] Inventor: Tetsuo Miyasaka, Hachioji, Japan

[73] Assignee: Olympus Optical Company, Ltd., Tokyo, Japan

[21] Appl. No.: 23,111

[22] Filed: Mar. 6, 1987

[30] Foreign Application Priority Data

Mar. 14, 1986 [JP] Japan .................. 61-057650

[51] Int. Cl.⁴ .................................................. G03B 7/097
[52] U.S. Cl. ...................................... 354/443; 354/441
[58] Field of Search ................ 354/441, 442, 443, 412

[56] References Cited

U.S. PATENT DOCUMENTS

| | | | |
|---|---|---|---|
| 4,103,307 | 7/1978 | Shinoda et al. | 354/412 |
| 4,213,682 | 7/1980 | Yamada | 354/443 |
| 4,320,944 | 3/1982 | Nakai | 354/443 |
| 4,455,068 | 6/1984 | Izuhara | 354/412 |
| 4,496,230 | 1/1985 | Nakai et al. | 354/441 |
| 4,616,916 | 10/1986 | Someya et al. | 354/442 |
| 4,653,893 | 3/1987 | Inoue et al. | 354/443 |
| 4,673,277 | 6/1987 | Someya et al. | 354/442 |

FOREIGN PATENT DOCUMENTS 0006550 1/1976 Japan .
0151626 11/1980 Japan .

*Primary Examiner*—Russell E. Adams
*Attorney, Agent, or Firm*—Louis Weinstein

[57] ABSTRACT

When establishing a program exposure response of a camera, an EV value is calculated from the brightness of an object being photographed, a film speed and the like, and a programmed calculation is made on the basis of a preset program response and the EV value to determine an exposure period and a diaphragm aperture in the absence of a program shift input. However, in the presence of a program shift operation, the relationship between an exposure period and a diaphragm aperture is shifted through a given number of steps, and a new program response is established so that the exposure period and the diaphragm aperture varies according to an EV value from their shifted value, thus determining an exposure control value.

17 Claims, 16 Drawing Sheets

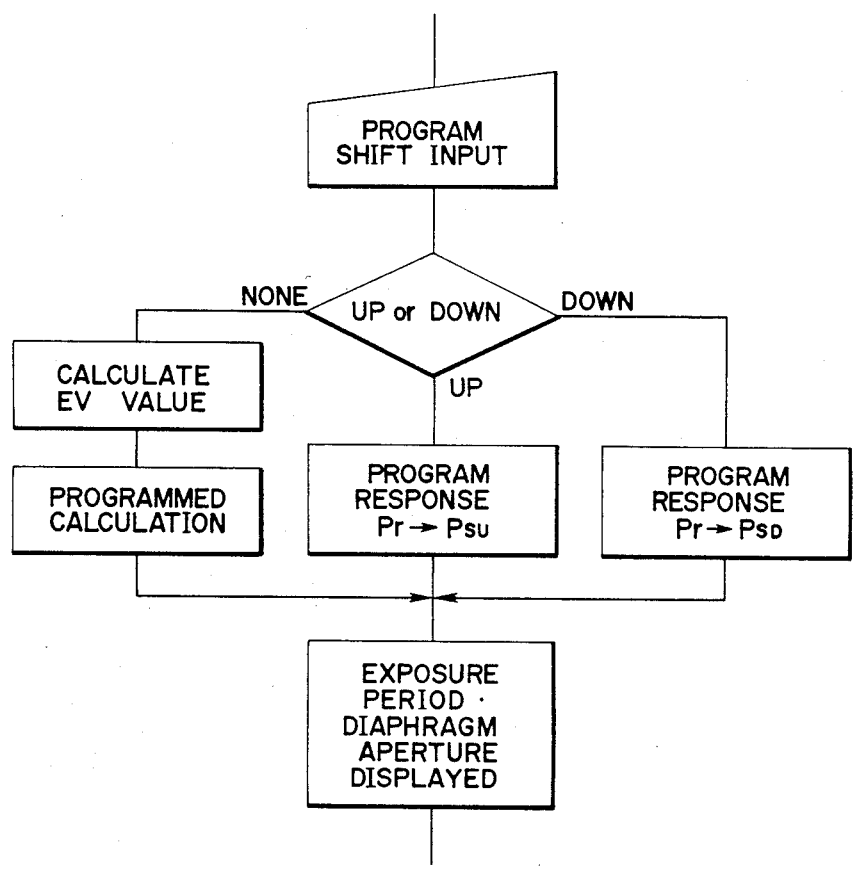

METHOD OF AND APPARATUS FOR ESTABLISHING A PROGRAMMABLE EXPOSURE RESPONSE OF CAMERA

BACKGROUND OF THE INVENTION

The invention relates to a method of and an apparatus for establishing a programmable exposure response of a camera, and more particularly, to such method and apparatus in which a programmable response which determines a combination of an exposure period and a diaphragm aperture can be shifted.

A camera with an automatic exposure control is known in which a combination of an exposure period and a diaphragm aperture can be varied by choosing one of a plurality of programmed responses as illustrated in FIG. 23 or 24 in response to one of a plurality of program signals (see Japanese Laid-Open Patent Applications No. 6,550/1976 and No. 151,626/1980). In each instance, a programmed response Pr is chosen as a reference, and other programmed responses are selected as an up-shift or a down-shift through a switch or through a resistor connection. For an up-shift, another programmed response $P_{SU}$ which employs a smaller exposure period TV for the same value of diaphragm aperture AV is selected. For a down-shift, a further programmed response $P_{SD}$ which employs a greater exposure period TV is selected.

A typical selection of a programmed response is illustrated by a flowchart shown in FIG. 25. In response to a shift input, the programmed response Pr is shifted either up or down while in the absence of a shift input, an EV value is calculated on the basis of the brightness of an object being photographed and a film speed, and utilizing the selected programmed response and EV value, an exposure period TV and a diaphragm aperture AV are calculated according to a program.

In the conventional program shift operation as illustrated by the flowchart of FIG. 25, the slope of the programmed response is changed (see FIG. 23) or the programmed response is caused to be translated (see FIG. 24) independently from an exposure period and a diaphragm value which correspond to a photographing situation. Accordingly, when a photographer desires to change the relationship between an exposure period and a diaphragm value by a given amount, difficulties are experienced that the number of steps depend on a particular EV value or the same step may be used for certain EV values.

OBJECT AND SUMMARY OF THE INVENTION

The invention overcomes this problem, and has for its object the provision of a method of and an apparatus for establishing a programmed exposure response of a camera in which the relationship between an exposure period and a diaphragm aperture is changed through a given number of steps in response to a program shift operation, thereby allowing a program response to be selected so that after the shift operation, both the exposure period and the diaphragm aperture vary in a manner dependent on an EV value.

A method of and an apparatus for establishing a programmed exposure response of a camera according to the invention may be generally described with reference to FIG. 1 which illustrates a flowchart. In response to a program shift input, an operating point α (TVr, AVr) on a programmed response Pr shown in FIG. 2 is shifted through a given number of steps in a direction to maintain an equivalent EV value for the exposure period and the diaphragm aperture. For example, for a down shift, the operating point is shifted through a given number of steps to another point β (TVs, AVs) so that the exposure period shifts toward a greater value (DOWN) while the diaphragm aperture shifts toward a reduced value (UP). For an up shift, the shift occurs so as to shift the exposure period toward a reduced value (UP) and shift the diaphragm aperture toward an open value (DOWN). Subsequent to the shift operation, another programmed response Ps which contains the operating point β is re-established, and the exposure period and the diaphragm aperture are determined and displayed according to the programmed response Ps in a manner corresponding to a change in the EV value. In the absence of a shift input, an EV value is derived from the brightness of an object being photographed, a film speed or the like, and a programmed calculation is made using the program response which is established and the EV value thus obtained, thus displaying an exposure period and a diaphragm aperture.

Thus, with the present invention, the relationship between the exposure period and the diaphragm aperture is shifted through a given number of steps in response to a program shift operation, so that as the EV value changes subsequent to the shift operation, the combination of the exposure period and the diaphragm value may change along the re-established program response in a manner corresponding to the EV value. Accordingly, a desired shift operation can be obtained from any point on a program response on which the exposure period and the diaphragm aperture are presently located, by shifting through a given number of steps of the relationship between the exposure period and the diaphragm aperture.

BRIEF DESCRIPTION OF THE DRAWINGS

FIG. 25 is a flowchart for establishing a program response as illustrated in FIGS. 23 and 24.

DETAILED DESCRIPTION OF PREFERRED EMBODIMENTS

Figure 1:
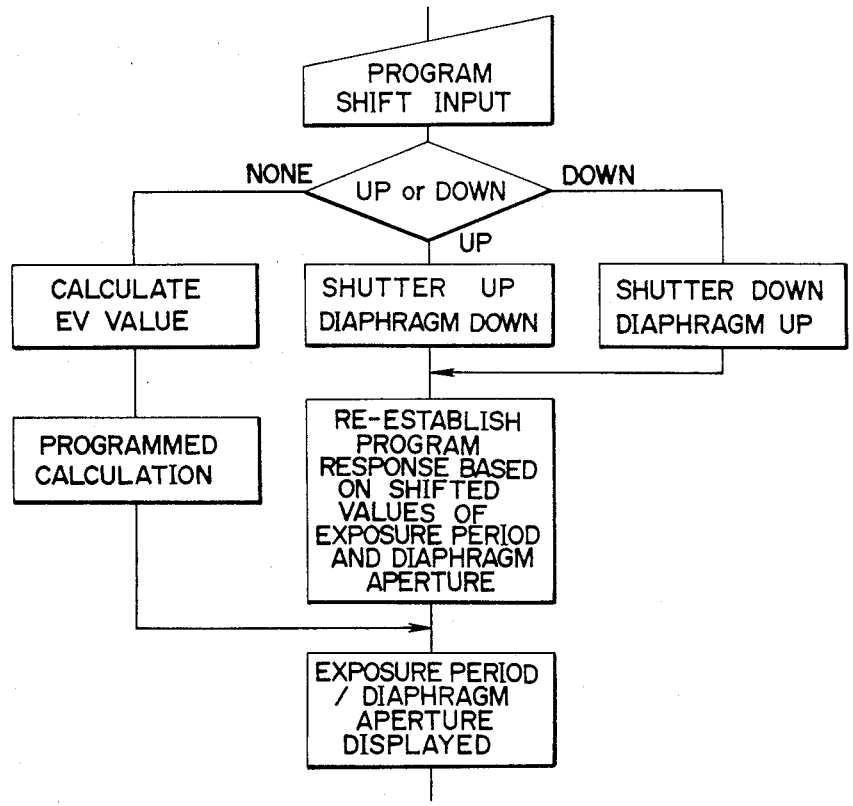
FIG. 1 is a flow chart showing a basic concept of the invention.
Figure 2:
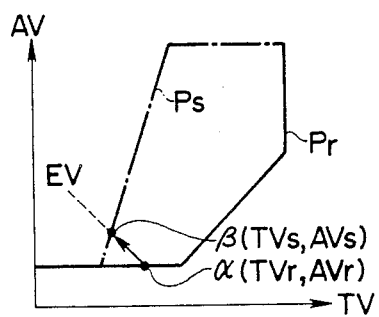
FIG. 2 graphically shows several programmed responses which illustrate the fundamental concept of the invention.
Figure 3A:
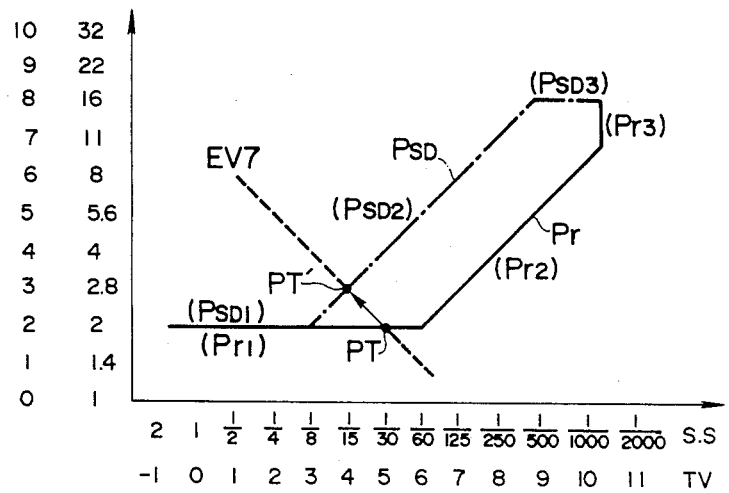
FIGS. 3A to 3C illustrate program responses and associated a up shift and a down shift operations according to a first embodiment of the invention.
Figure 3B:
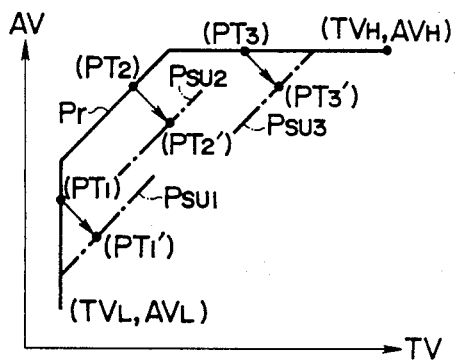
Figure 3C:
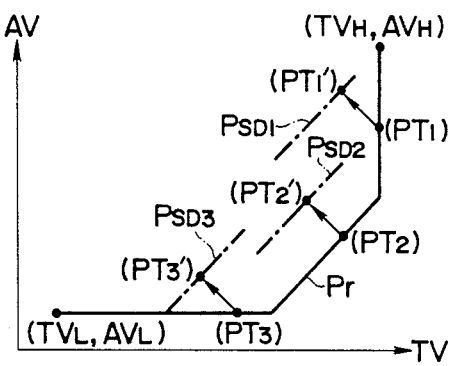

Referring to FIGS. 3A to 3C, there are shown several changes in the program resonse according to a first embodiment of the invention. Referring to FIG. 3A, it is assumed that a shutter exhibits a minimum speed of 2 seconds and a maximum speed of 1/1000 second, and a lens has an open F-value of F2 and a minimum F-value of F16. An initialized program response is indicated by a solid line Pr. The program response Pr includes a rectilinear portion $P_{rl}$ in which the diaphragm is maintained open for EV1 to EV8 and in which the exposure period changes through one step for each 1 EV, another rectilinear portion $P_{r2}$ in which the exposure period and the diaphragm aperture changes through 0.5 step for each 1 EV in a range from EV8 to EV18, and a further rectilinear portion $P_{r3}$ in which the exposure period is maintained at 1/100 second up to EV18 to EV19 and the diaphragm aperture changes through one step for each 1 EV.

Assuming now that the operating point is located at EV7, this means that an exposure period is equal to 1/30 second (TV5) while a diaphragm aperture is equal to F2 (AV2), this point being indicated by PT. When a photographer performs a down shift operation with an intent "to change the shutter operation toward a slower speed and to change the diaphragm aperture to a smaller aperture", the operating point will shift to a point PT' where the exposure period is equal to 1/15 second (TV6) and the diaphragm aperture is equal to F2.8 (AV3). It will be seen that a rectilinear line which passes through the point PT' and which provides a change in the exposure period and the diaphragm aperture through 0.5 step for 1 EV is as indicated by $P_{SD2}$. It will be noted that the rectilinear portion $P_{SD2}$ is defined between EV5 and EV17 while it will be defined as a rectilinear portion $P_{SD1}$ between EV1 and EV5 and is defined by a rectilinear portion $P_{SD3}$ between EV17 and EV19. To summarize, the down shift operation has shifted the program response from Pr to a program response $P_{SD}$ which is indicated by phantom line.

In the method of establishing a programmed exposure response according to a first embodiment of the invention, the down shift operation from rectilinear portions $P_{r2}$ or $P_{r3}$ is also possible, in addition to a shift from the rectilinear portion $P_{rl}$. Referring to FIG. 3C to describe such variations, it is to be noted that $TV_L$ represents a minimum shutter speed and $TV_H$ a maximum shutter speed while $AV_L$ represents an open aperture and $AV_H$ a minimum aperture. It will be seen that a point $(TV_L, AV_L)$ represents the lower limit of an interlocked exposure operation in which an exposure period and a diaphragm aperture respond to an EV value, and a point $(TV_H, AV_H)$ represents the upper limit of such interlocked exposure operation. By way of example, considering a down shift operation which brings the operating point from the point PT1 on the program response Pr, these parameters will shift to the values of a point PT1', whereby the program response is altered to a rectilinear portion $P_{SD1}$. By way of another example, considering a down shift operation from an operating point PT2 where the exposure period and the diaphragm aperture are determined by a previous EV value, the exposure period and the diaphragm aperture will change to the values of a point PT2', whereby the program response will be altered to a rectilinear portion $P_{SD2}$. Similarly, a down shift operation from an operating point PT3 shifts to a new operating point PT3' whereby the program response will be altered to a rectilinear portion $P_{SD3}$.

A photographer may perform an up shift operation with an intent of "shifting the exposure period to a higher speed and shifting the diaphragm aperture to a greater aperture". Such up shift operation will be described with reference to FIG. 3B. It may be assumed that an up shift operation has shifted the operating point from PT1 on the program response Pr. In this instance, the exposure period and the diaphragm aperture will be shifted to the values at point PT1', whereby the program response will be altered to a rectilinear portion $P_{SU1}$. Similary, an up shift operation from an operating point PT2 shifts to a new operating point PT2', whereby the program response will be altered to a rectilinear portion $P_{SU2}$, and an up shift operation from an operating point PT3 shifts to a new operating point PT3', whereby the program response will be altered to a rectilinear portion $P_{SU3}$.

Figure 4:
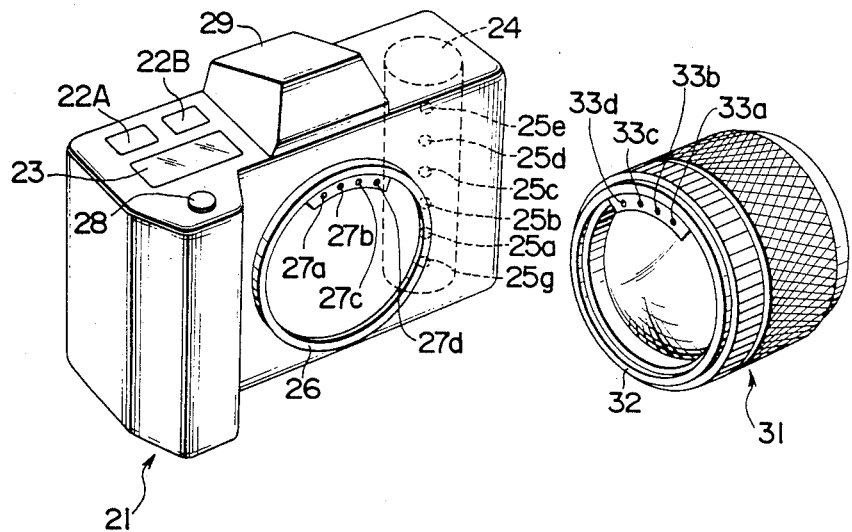
FIG. 4 is a perspective view of a camera to which the invention is applied, with a lens barrel removed.

FIG. 4 is a perspective view of a camera to which the invention is applied, with a lens barrel removed and as viewed in an oblique direction from the front side. A camera body 21 has a top surface in which an up shift switch 22A and a down shift switch 22B which enable a program shift operation are disposed. Also disposed in the top surface of the camera body 21 is a display element 23 such as may be formed by a liquid crystal display which displays proper values of an exposure period and a diaphragm aperture which are determined by an established program response. The camera body 21 includes a film magazine chamber 24 which receives a film magazine therein. A plurality of contacts are mounted on the wall of the chamber 24, including DX contacts 25a to 25e and a ground contact 25g which read an ISO sensitivity information of a film or a so-called DX code which is printed on the film magazine. The camera body 21 includes a mount 26 which is internally provided with a plurality of electrical contacts 27a to 27d which are adapted to mate with a corresponding plurality of electrical contacts 33a to 33d which are disposed on the inside of a mount 32 associated with a lens barrel 31 for transmitting an open F-value and a minimum F-value of a particular lens to the camera. FIG. 4 also shows a release button 28 and a pentaprism assembly 29.

Figure 5:
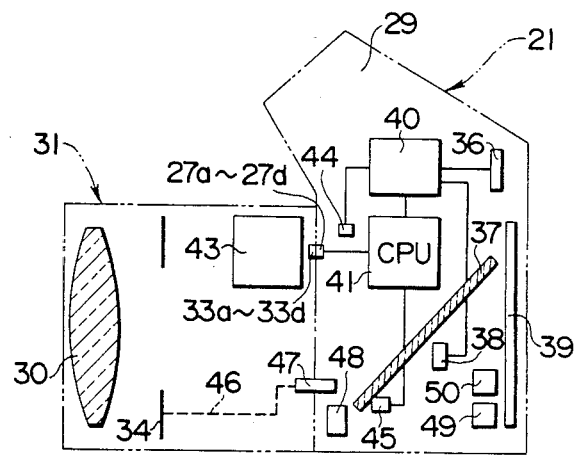
FIG. 5 is a schematic side elevation of the camera shown in FIG. 4 with the lens barrel mounted thereon.

FIG. 5 is a schematic side elevation, as viewed from a lateral side, of the camera body 21 in which the lens barrel 31 is mounted. In this Figure, first light receiving element 36 is disposed in an eyepiece assembly which receives light from an object being photographed impinging upon a taking lens 30 and passing through a diaphragm 34 after it has been reflected by a movable reflecting mirror 37 and transmitting through the pentaprism assembly 29. Second light receiving element 38 is disposed on the back side of the mirror 37 within a mirror box, not shown, for receiving a portion of light from an object being photographed which is reflected by a first shutter blind of a shutter unit 39 and a film surface. The elements 36, 38 are connected to a photometric exposure control circuit 40 which effects the photometry of the brightness of an object being photographed and a control over the shutter and the diaphragm. The photometric exposure control circuit 40 is connected to a central processing unit (hereafter referred to as CPU) 41, which is also connected with an F-value delivery circuit 43 disposed within the lens barrel 31 through the described contacts 27a to 27d and 33a to 33d. Also connected to the photometric exposure control circuit 40 is a switch 44 which is turned on at the end of an upward movement of the movable mirror 37 while a switch 45 which is turned on at the initiation of an upward movement of the mirror 37 is connected to CPU 41.

The lens barrel 31 internally houses the diaphragm 34 which is integrally coupled to a diaphragm controlling lever 46, which is capable of engagement with a corresponding diaphragm controlling lever 47 which is disposed within the camera body 21. A diaphragm stopping electromagnet 48 is disposed adjacent to the lever 47. The timing at which the running of a first and a second shutter blind of the shutter unit 39 is initiated is controlled by first blind controlling electromagnet 49 and second blind controlling electromagnet 50, respectively.

In operation, as the release button 28 is depressed, the mirror 37 begins to move upward, concurrently turning the switch 45 on. The diaphragm controlling levers 46, 47 begin to control the aperture of the diaphragm 34 at a point intermediate the upward movement of the mirror, and cease their controlling action in response to the energization of the electromagnet 48. The first shutter blind is mechanically charged when the mirror 37 assumes its photometric position shown in FIG. 5, maintains its charged condition as long as the first blind controlling electromegnet 49 remains energized at the end of the upward movement of the mirror, and releases its action to maintain the charged condition to allow the first blind to begin running as soon as the electromagnet 49 becomes deenergized. Similarly, the second shutter blind is mechanically charged when the mirror 37 assumes its photometric position, maintains the charged condition as long as the second blind controlling elelctromagnet 50 remains energized at the end of the upward movement of the mirror, and begins to run as soon as the electromagnet 50 becomes deenergized.

Figure 6:
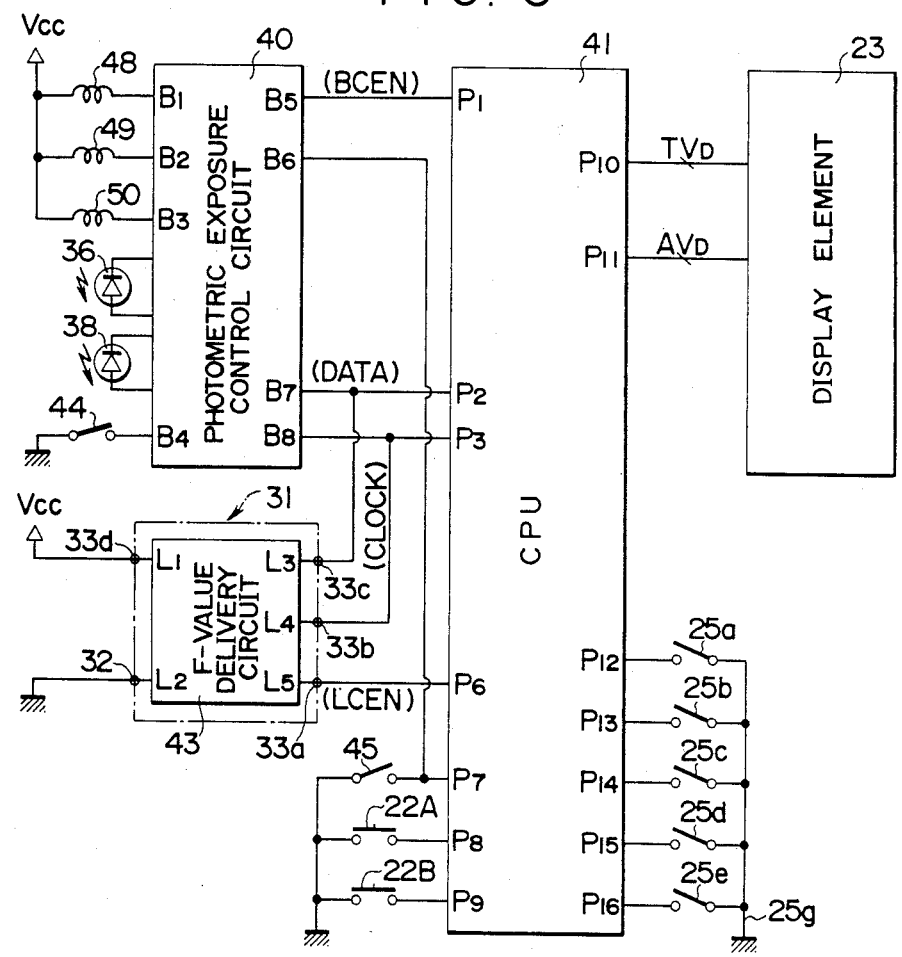
FIG. 6 is a block diagram of an electrical circuit disposed within the camera shown in FIG. 5.

FIG. 6 is a block diagram of an electrical circuit which is used within the camera shown in FIGS. 4 and 5. As shown, the electromagnets 48 to 50 are connected between terminals B1 to B3 of the exposure control circuit 40 and a terminal Vcc to which a supply voltage is applied, and a switch 44 is connected between a terminal B4 of the exposure control circuit and the ground. The switch 45, the up shift switch 22A and the down shift switch 22B are connected between terminals P7 to P9 of CPU 41, respectively, and the ground. The DX contacts 25a to 25e have their one pole connected to terminals P12 to P16, respectively, of CPU 41 and other pole connected to the ground together with the ground contact 25g. An interconnection is established between the photometric exposure control circuit 40 and CPU 41, through connections between terminal B5 and terminal P1, between terminal B6 and terminal P7, between terminal B7 and terminal P2, between terminal B8 and terminal P3. Terminals P2, P3 and P6 of CPU 41 are also connected to terminals L3, L4 and L5, respectively, of the F-value delivery circuit 43 disposed within the lens barrel 31 through the electrical contacts 33c (27c), 33b (27b), and 33a (27a), respectively. Terminal L1 of the F-value delivery circuit 43 is connected to the terminal Vcc through the contact 33d (27d), and its terminal L2 is connected to the ground through the mount 32 (26). Additionally, terminals P10 and P11 of CPU 41 are connected to the display element 23 through cords TVD and AVD which convey an exposure period and a diaphragm aperture, respectively.

Figure 7:
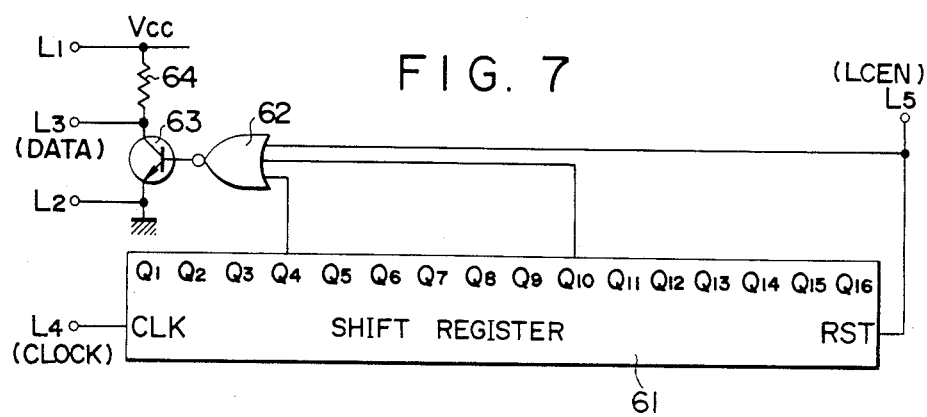
FIG. 7 is a circuit diagram of an F-value delivery circuit shown in FIG. 6.

Referring to FIG. 7, the F-value delivery circuit 43 comprises a 16 bit shift register 61, a three input NOR gate 62 connected to selected outputs of the shift register 61, an NPN transistor 63 which is turned on and off in response to an output from the gate 62, and a resistor 64 connected to the collector of the transistor 63. One end of the resistor 64 which is connected to the supply voltage Vcc defines terminal L1, the collector of the transistor 63 which is connected to the other end of the resistor 64 defines terminal L3, the grounded emitter of the transistor 63 defines terminal L2, the reset terminal of the shift register 61 and one input of the gate 62 define terminal L5, and the clock terminal of the shift register 61 defines terminal L4. Two remaining inputs of the gate 62 are connected to outputs Q4 and Q10 of the shift register 61.

Figure 9:
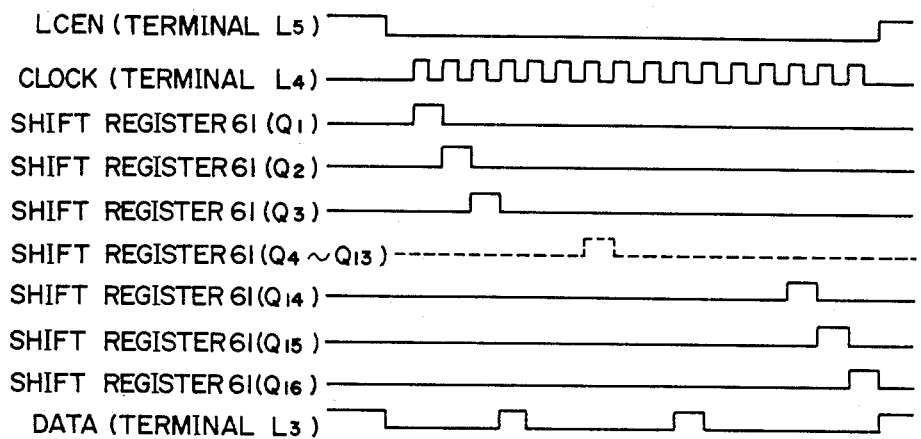
FIG. 9 graphically shows a series of timing charts illustrating various signals appearing in the circuit shown in FIG. 7.

When a clock signal CLOCK is fed from terminal P3 to terminal L4 and a signal LCEN is fed from terminal P6 to terminal L5, the F-value delivery circuit 43 shown in FIG. 7 operates in a manner indicated by a series of timing charts shown in FIG. 9, delivering data signal DATA from terminal L3 to terminal P2. Specifically, when the signal LCEN changes from its high level (hereafter abbreviated as "H") to a low level (hereafter abbreviated as "L"), the shift register 61 is enabled or its cleared condition is released, and output terminals Q1 to Q16 of the shift register 61 sequentially assume "H" level each time the clock signal CLOCK changes from "L" to "H" level. Output terminals Q1 to Q8 are used to deliver an open F-value while output terminals Q9 to Q16 deliver a minimum F-value. Accordingly, the interconnection between the shift register 61 and the gate 62 is made within the lens barrel 31 in a manner as indicated by Table 1 shown below.

TABLE 1

| AV | F No. | hexadecimal AV$_L$ / AV$_H$ / AVx | Q1 / Q9 | Q2 / Q10 | Q3 / Q11 | Q4 / Q12 | Q5 / Q13 | Q6 / Q14 | Q7 / Q15 | Q8 / Q16 | AV$_L$ / AV$_H$ |
|---|---|---|---|---|---|---|---|---|---|---|---|
| 0   | 1.0 | 00 |   |   |   |   |   |   |   |   |   |
| 0.5 | 1.2 | 04 |   |   |   |   |   | 1 |   |   |   |
| 1.0 | 1.4 | 08 |   |   |   |   | 1 |   |   |   |   |
| 1.5 | 1.7 | 0C |   |   |   |   | 1 | 1 |   |   |   |
| 2.0 | 2.0 | 10 |   |   |   | 1 |   |   |   |   |   |
| 2.5 | 2.5 | 14 |   |   |   | 1 |   | 1 |   |   |   |
| 3.0 | 2.8 | 18 |   |   |   | 1 | 1 |   |   |   |   |
| 3.5 | 3.5 | 1C |   |   |   | 1 | 1 | 1 |   |   |   |
| 4.0 | 4.0 | 20 |   |   | 1 |   |   |   |   |   |   |
| 4.5 | 4.5 | 24 |   |   | 1 |   |   | 1 |   |   |   |
| 5.0 | 5.6 | 28 |   |   | 1 |   | 1 |   |   |   |   |
| 5.5 | 6.7 | 2C |   |   | 1 |   | 1 | 1 |   |   |   |
| 6.0 | 8.0 | 30 |   |   | 1 | 1 |   |   |   |   |   |
| 6.5 | 9.5 | 34 |   |   | 1 | 1 |   | 1 |   |   |   |
| 7.0 | 11  | 38 |   |   | 1 | 1 | 1 |   |   |   |   |
| 7.5 | 13  | 3C |   |   | 1 | 1 | 1 | 1 |   |   |   |
| 8.0 | 16  | 40 |   | 1 |   |   |   |   |   |   |   |
| 8.5 | 19  | 44 |   | 1 |   |   |   | 1 |   |   |   |
| 9.0 | 22  | 48 |   | 1 |   |   | 1 |   |   |   |   |
| 9.5 | 27  | 4C |   | 1 |   |   | 1 | 1 |   |   |   |
| 10.0| 32  | 50 |   | 1 |   | 1 |   |   |   |   |   |
|     |     |    | 16 | 8 | 4 | 2 | 1 | ½ | ¼ | ⅛ | EV |

In Table 1, "1" appearing in selected columns aligned with outputs Q1 to Q16 of the shift register 61 indicates a particular output thereof which is connected to an input of the gate 62 shown in FIG. 7, thus representing an open F-value and a minimum F-value of the lens barrel 31 which is mounted on the camera. Thus, each time the clock signal CLOCK changes from "L" to "H" level, data signal DATA representing an open F-value and a minimum F-value are delivered in a serial manner. Each time the clock signal CLOCK changes from "H" to "L" level, a particular level "H" or "L" of data signal DATA from the F-value delivery circuit 43 is written into a random access read/write memory (RAM) which is contained within CPU 41. The content which is written into RAM is as indicated in Table 2 below.

TABLE 2

| (RAM) address | 7 | 6 | 5 | 4 | 3 | 2 | 1 | 0 | bit |
|---|---|---|---|---|---|---|---|---|---|
| $0 |   |   |   | AV$_L$ |   |   |   |   |   |
| $1 |   |   |   | AV$_H$ |   |   |   |   |   |
| $2 |   |   |   | BVx |   |   |   |   |   |
| $3 |   |   |   | SVx |   |   |   |   |   |
| $4 |   |   |   | EVx |   |   |   |   |   |
| $5 |   |   |   | TVx |   |   |   |   |   |
| $6 |   |   |   | AVx |   |   |   |   |   |
| $7 |   |   |   | Px  |   |   |   |   |   |
| $8 |   |   |   | TV$_{D1}$ |   |   |   |   |   |
| $9 |   |   |   | TV$_{D2}$ |   |   |   |   |   |
| $A |   |   |   | TV$_{D3}$ |   |   |   |   |   |
| $B |   |   |   | TV$_{D4}$ |   |   |   |   |   |
| $C |   |   |   | AV$_{D1}$ |   |   |   |   |   |
| $D |   |   |   | AV$_{D2}$ |   |   |   |   |   |
| $E |   |   |   | DAV |   |   |   |   |   |
| $F | 1 | 1 | 1 | P12 | P13 | P14 | P15 | P16 |   |
|    | 16 | 8 | 4 | 2 | 1 | ½ | ¼ | ⅛ | EV |

When "H" or "L" level of data signal DATA is fed to RAM shown in Table 2, an open F-value AV$_L$ is written into at an address $0 from 7-th to 0 bit in a sequential manner, and a minimum F-value AV$_H$ is sequentially written into at an address $1 from 7-th to 0 bit. In this manner, the open F-value and the minimum F-value of the lens barrel 31 is written into CPU 41.

Considering a reading operation of a film speed SV by DX contacts 25a to 25e which are connected to terminals P12 to P16 of CPU 41, it is to be noted that the terminals P12 to P16 are pulled up through resistors, not shown, within CPU 41. Accordingly, only those CPU terminals associated with closed ones of DX contacts 25a to 25e which are determined by the DX codes printed on the film magazine assume "L" level and the remaining terminals assume "H" level. Such "H" or "L" levels obtained at the terminals P12 to P16 are fed to RAM within CPU 41 to be temporarily stored at an address $F of RAM, as indicated in Table 2.

On the other hand, the DX code printed on the film magazine is coded according to the ISO value of the film speed, in a manner indicated in Table 3 below.

TABLE 3

| ISO | 25a | 25b | 25c | 25d | 25e | hexadecimal $SV | decimal SV | hexadecimal SVx |
|---|---|---|---|---|---|---|---|---|
| 25   |   |   |   | o |   | FD | 3.0 | 18 |
| 32   |   |   |   |   | o | FE | 3.3 | 1B |
| 40   |   |   |   | o | o | FC | 3.7 | 1D |
| 50   | o |   |   | o |   | ED | 4.0 | 20 |
| 64   | o |   |   |   | o | EE | 4.3 | 23 |
| 80   | o |   |   | o | o | EC | 4.7 | 25 |
| 100  |   | o |   | o |   | F5 | 5.0 | 28 |
| 125  |   | o |   |   | o | F6 | 5.3 | 2B |
| 160  |   | o |   | o | o | F4 | 5.7 | 2D |
| 200  | o | o |   | o |   | E5 | 6.0 | 30 |
| 250  | o | o |   |   | o | E6 | 6.3 | 33 |
| 320  | o | o |   | o | o | E4 | 6.7 | 35 |
| 400  |   |   | o | o |   | F9 | 7.0 | 38 |
| 500  |   |   | o |   | o | FA | 7.3 | 3B |
| 640  |   |   | o | o | o | F8 | 7.7 | 3D |
| 800  | o |   | o | o |   | E9 | 8.0 | 40 |
| 1000 | o |   | o |   | o | EA | 8.3 | 43 |
| 1250 | o |   | o | o | o | E8 | 8.7 | 45 |
| 1600 |   | o | o | o |   | F1 | 9.0 | 48 |
| 2000 |   | o | o |   | o | F2 | 9.3 | 4B |
| 2500 |   | o | o | o | o | F0 | 9.7 | 4D |
| 3200 | o | o | o | o |   | E1 | 10.0 | 50 |
| 4000 | o | o | o |   | o | E2 | 10.3 | 53 |
| 5000 | o | o | o | o | o | E0 | 10.7 | 55 |

Accordingly, data at the address $F of RAM will be as indicated at $SV in Table 3. Random access read only memory (ROM) within CPU 41 stores SV data SVx of the film speed at addresses $E0 to $FF in a manner indicated in Table 4 below.

TABLE 4

| (ROM) address | hexadecimal SVx | address | hexadecimal SVx |
|---|---|---|---|
| $E0 | 55 | $F0 | 4D |
| $E1 | 50 | $F1 | 48 |
| $E2 | 53 | $F2 | 4B |
| $E3 | 50 | $F3 | 48 |
| $E4 | 35 | $F4 | 2D |
| $E5 | 30 | $F5 | 28 |
| $E6 | 33 | $F6 | 2B |
| $E7 | 30 | $F7 | 28 |
| $E8 | 45 | $F8 | 3D |
| $E9 | 40 | $F9 | 38 |
| $EA | 43 | $FA | 3B |
| $EB | 40 | $FB | 38 |
| $EC | 25 | $FC | 1D |
| $ED | 20 | $FD | 18 |
| $EE | 23 | $FE | 1B |
| $EF | 20 | $FF | 18 |

Using data $SV at an address $F of RAM (see Table 3) as an address to ROM, data SVx contained within ROM at the corresponding address is stored in RAM at an address $3 (see Table 2), with consequence that DX code is converted into SV value (SVx).

Figure 8:
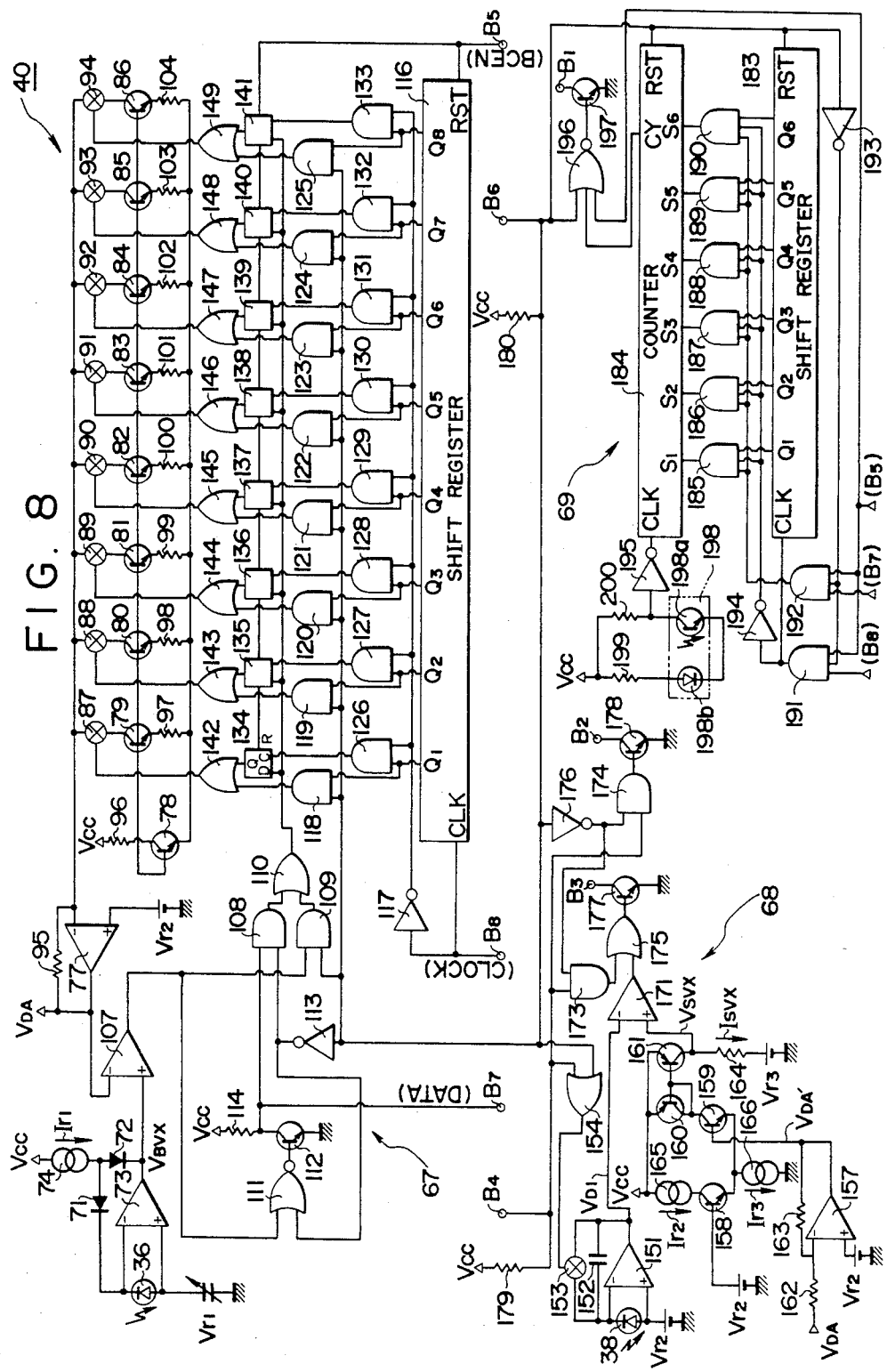
FIG. 8 is a circuit diagram of a photometric exposure control circuit shown in FIG. 6.

A specific circuit arrangement of the photometric exposure control circuit 40 shown in FIG. 6 is indicated in FIG. 8. Referring to FIG. 8, the photometric exposure control circuit 40 comprises a photometric circuit section 67, a shutter control circuit section 68 and a diaphragm control circuit section 69. The photometric circuit section 67 comprises a photometric output circuit including the first light receiving element 36 which is formed by a photodiode, diodes 71 and 72, an operational amplifier 73 and a constant current source 74; a D/A (digital-to-analog) converter including an operational amplifier 77, PNP transistors 78 to 86, analog switches 87 to 94 and resistors 95 to 104; an A/D conversion comparator 107 which compares an output from the D/A converter against the output from the photometric output circuit; a network connected to the output of the comparator 107 and including AND gates 108 and 109, OR gate 110, NOR gate 111, NPN transistor 112, an inverter 113 and a resistor 114; and another network connected between the output of the first mentioned network and the input of the D/A converter and including 8 bit shift register 116, an inverter 117, AND gates 118 to 133, D-type flipflops (hereafter abbreviated as D-FF) 134 to 141 and OR gates 142 to 149.

The shutter control circuit section 68 comprises an integrating circuit including the second light receiving element 38 which is formed by a photodiode, an operational amplifier 151, a capacitor 152, an analog switch 153 and an OR gate 154; a network including an operational amplifier 157, NPN transistors 158 and 159, PNP transistors 160 and 161, resistors 162 to 164 and constant current sources 165 and 166; a comparator 171 which compares an output from the network against an output from the integrating circuit; and a shutter drive circuit connected to the output of the comparator 171 and including AND gates 173 and 174, OR gate 175, an inverter 176, NPN transistors 177 and 178, and resistors 179 and 180.

The diaphragm control circuit section 69 comprises a 6 bit shift register 183, a counter 184, AND gates 185 to 192, inverters 193 to 195, a three input NOR gate 196, an NPN transistor 197, a photo-coupler 198 and resistors 199 and 200.

Currents $I_{r1}$, $I_{r2}$ and $I_{r3}$ of respective constant magnitudes flow through the sources 74, 165 and 166, respectively. A reference voltage $V_{r1}$ is applied to a noninverting input of the amplifier 73; a reference voltage $V_{r2}$ is applied to a non-inverting input of amplifiers 77, 151 and 157 and to the base of the transistor 158; and a reference voltage $V_{r3}$ is applied to the resistor 164.

Figure 10:
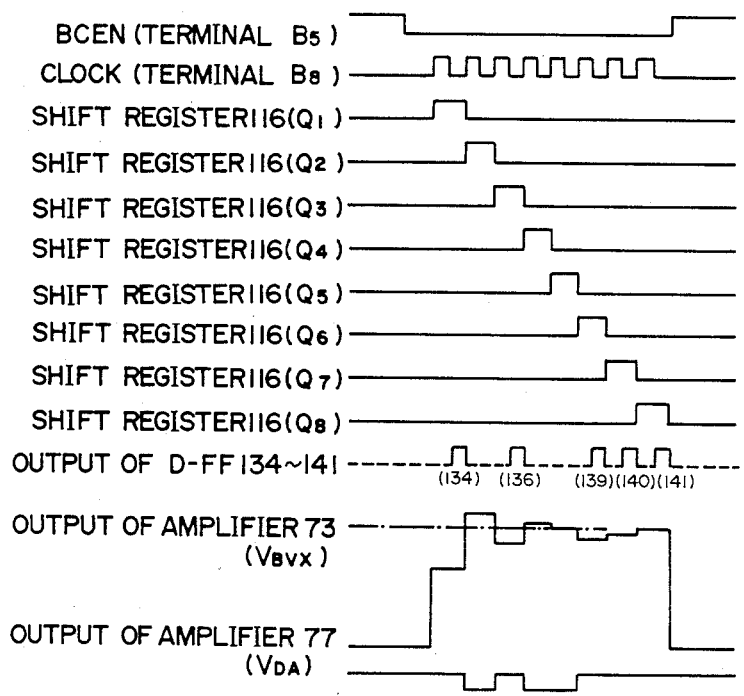
FIGS. 10 and 11 each graphically show a series of timing charts illustrating various signals appearing in the circuit shown in FIG. 8.

Describing the operation starting with the photometric circuit section 67, light from an object being photographed impinges upon the light receiving element 36, which converts the light into a corresponding current. At this current passes through the diode 71, the amplifier 73 develops a voltage at its output which depends on the magnitude of light from an object being photographed. An output voltage VBVx corresponds to the brightness BVx of an object being photographed. The voltage VBVx is compared against an output voltage VDA from the amplifier 77 in the comparator 107, whereby photometric data signal DATA representing the voltage VBVx as converted into a digital form is available at terminal B7. Describing the A/D conversion of the voltage VBVx with reference to a series of timing charts shown in FIG. 10, the switch 45 (see FIG. 6) is off during the photometric condition, so that terminal B6 assumes "H" level due to the presence of a pull-up resistor 180, thus feeding "H" level to one input of the gates 109 and 118 to 125. When the signal BCEN fed from terminal P1 of CPU 41 changes terminal B5 from "H" to "L" level, the shift register 116 and D-FF's 134 to 141 are enabled or released from their reset condition, and hence as the clock signal CLOCK fed from terminal B8 changes from "L" to "H" level, the outputs Q1 to Q8 of the shift register 116 sequentially assume "H" level while simultaneously turning the analog switches 87 to 94 in a sequential manner. As the analog switches 87 to 94 are turned on, collector current flows through the transistors 79 to 86. The values of the resistors 96 to 104 are chosen such that the collector currents passing the transistors 79 to 86 are in the ratio of 16:8:4:2:1:½:¼:⅛. As a result of such constant current flowing through the transistors 79 to 86 and which also flows through the resistor 95, the amplifier 77 develops a voltage VDA at its output. If the photometric voltage VBVx is greater than the voltage VDA, the comparator 107 delivers an output of "H" level, whereupon the gate 109 produces an output of "H" level, which is a D input to each of D-FF's 134 to 141. Accordingly, in response to the falling edge of the clock signal CLOCK from its "H" to its "L" level, these flipflops are set to provide an output of "H" level, maintaining the analog switches 87 to 94 on. If the photometric voltage VBVx is less than the voltage VDA, a D-input to D-FF's 134 to 141 will be at "L" level, and these flipflops will be reset to provide an output of "L" level in response to the rising edge of the clock signal CLOCK from its "L" to its "H" level, thus turning the analog switches 87 to 94 off. The analog value of the photometric voltage VBVx is converted into a digital value in this manner, and such data signal DATA is delivered from terminal B7 to terminal P2 of CPU 41. CPU 41 then writes "H" or "L" level of the photometric data signal DATA supplied to its terminal P2 into RAM at the address $2 in a sequential manner starting with 7-th bit and continuing to 0 bit, thus storing it as brightness information BVx of an object being photographed (see Table 2).

Figure 11:
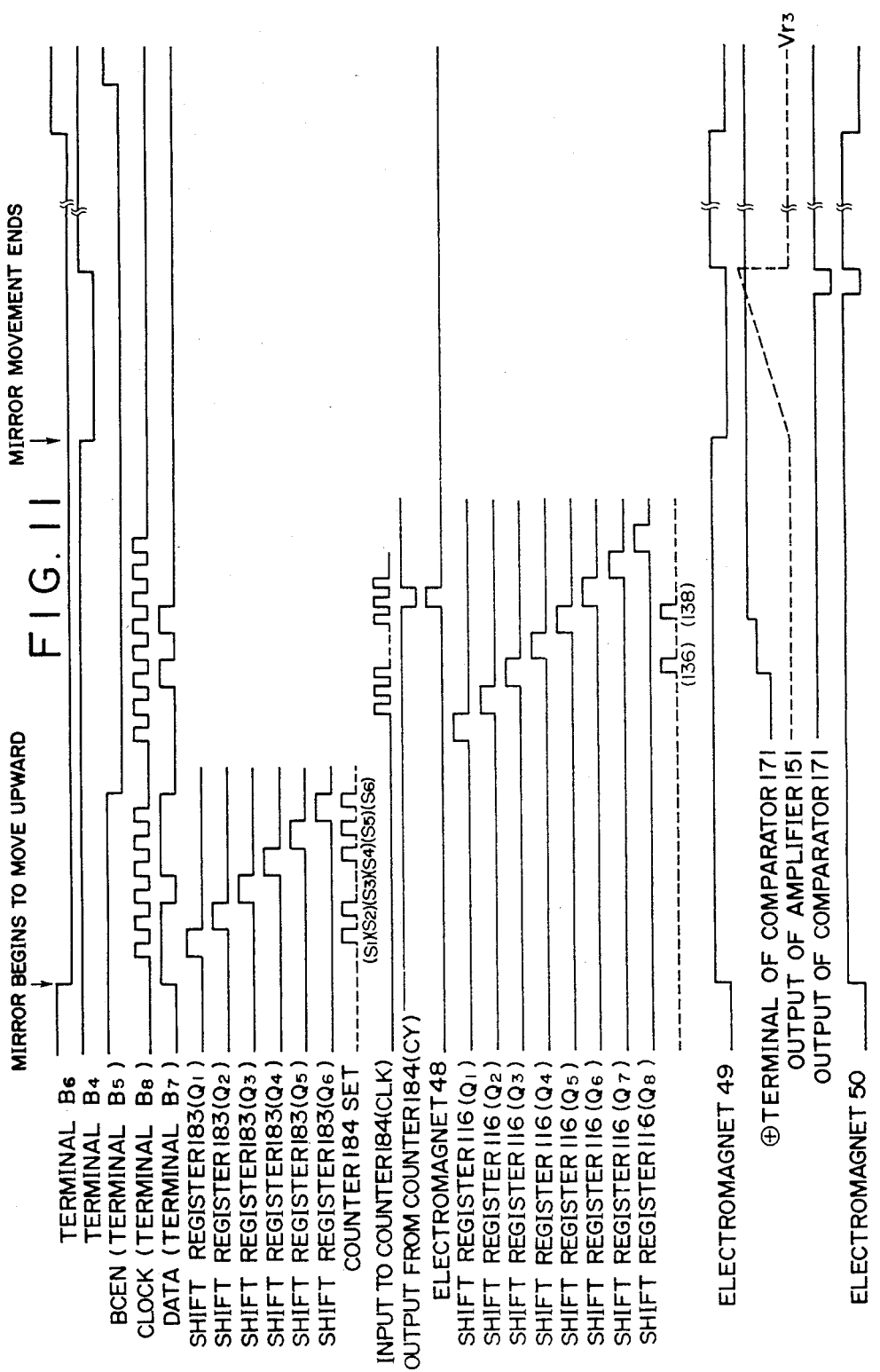

The operation of the diaphragm control circuit section 69 will now be described with reference to a series of timing charts shown in FIG. 11. Initially, as the release button 28 (see FIG. 4) is depressed, the movable mirror 37 begins to move upward, turning the switch 45

(see FIGS. 5 and 6) on. When terminal B6 changes from "H" to "L" level, the shift register 183 and the counter 184 are enabled, and subsequently when a number of diaphragm controlling steps DAV is fed as data signal DATA from terminal B7 or terminal P2 of CPU 41 through AND gate 192 in a serial form, the value of data signal DATA is loaded into the counter 184 in response to the falling edge of the clock signal CLOCK, which is fed through the gate 191, from its "H" to its "L" level. The number of diaphragm controlling steps DAV refers to a complement determined by an aperture value AVx, which is determined by the EV value and the program response, and from which an open diaphragm aperture value $AV_L$ is subtracted, and is calculated during the photometry before the movable mirror 37 moves upward and is stored in RAM of CPU 41 at the address $E. It is to be noted that during the photometry, EVx and AVx are also stored in RAM at addresses $4 and $6, respectively.

The photocoupler 198 is formed by a combination of light emitting diode 198a and a phototransistor 198b, between which is disposed a disc-shaped blade, not shown, which is adapted to rotate in interlocked relationship with the diaphragm controlling lever 47 (see FIG. 5) to intercept the emission from the diode 198a intermittently. When a diaphragm controlling operation is performed, a diaphragm pulse is fed to the counter 184 through the inverter 195 as the phototransistor 198b is turned on and off. In this manner, the counter 184 is incremented by the diaphragm pulse, and when the count which is loaded therein in accordance with the number of diaphragm controlling steps DAV is exceeded, its carry terminal CY changes from its "H" to its "L" level. Assuming that the counter 184 has a maximum count which corresponds to a number of diaphragm controlling steps of 8, it will be seen that when it is desired to control the diaphragm through two steps, DAV is set equal to 6, and when it is desired to control the diaphragm through three steps, DAV is set equal to 5. When the counter 184 is loaded with the number of diaphragm controlling steps DAV, CPU 41 changes the signal BCEN which is delivered from its terminal P1 to terminal B5 from "H" to "L" level, and since the transistor 197 which drives the diaphragm stopping electromagnet 48 is no longer inhibited from operation, so soon as the loaded count in the counter 184 is exceeded to make the terminal CY assume its "L" level, the transistor 197 is turned on to establish an "L" level at the terminal B1 to energize the electromagnet 48, thus stopping the diaphragm.

The operation of the shutter control circuit section 68 will now be described again referring to the timing charts shown in FIG. 11. As the switch 45 is turned on and the terminal B6 assumes "L" level, the transistor 178 is turned on, whereby terminal B2 assumes "L" level to begin the energization of the first blind controlling electromagnet 49, thus maintaining the first blind in its charged condition as long as the movable mirror 37 continues to move upward. Subsequently when the switch 44 is turned on and terminal B4 assumes "L" level to thereby turn the transistor 178 off, the electromagnet 49 becomes deenergized, allowing the first shutter blind to begin its running. As to the second shutter blind, it is maintained charged as a result of the energization of the second blind controlling electromagnet 50 by "L" level at terminal B3 achieved by turning the transistor 177 on as long as the mirror is moving upward. When CPU 41 completes the delivery of the number of diaphragm controlling steps DAV, it changes the signal BCEN fed to terminal B5 to its "L" level, thereby enabling the shift register 116 and D-FF's 134 to 141. Since the switch 45 is turned on and terminal B6 assumes "L" level, the output from the comparator 107 ceases to be input to D-FF's 134 to 141. CPU 41 now delivers SV value corresponding to a film speed or data SVx as data signal DATA fed to terminal B7, and the "H" or "L" level in data SVx is loaded into D-FF's 134 to 141 in response to the falling edge of the clock signal CLOCK from its "H" to its "L" level, thus selectively turning on the analog switches 87 to 94 in a corresponding manner.

When CPU 41 delivers data SVx which is equivalent to a film speed, the amplifier 77 develops an output voltage VDA which is proportional to data SVx.

$$VDA = V_{r2} + SVx - (kT/q)\ln 2 \qquad (1)$$

where k represents Boltzmann's constant, q the charge of an electron and T the absolute temperature. The voltage VDA is inverted by the amplifier 157, and hence the base voltage VDA' of the transistor 159 is obtained as follows:

$$VDA' = V_{r2} - SVx \cdot (kT/q)\ln 2 \qquad (2)$$

On the other hand, current ISVx passing through the resistor 164 is determined by the constant current $I_{r2}$ and the transistors 158 to 161 as follows:

$$ISVx = IS \cdot e^{(q/kT)\{VDA' - V_{r2} + (kT/q)\ln (I_{r2}/I_s)\}} \qquad (3)$$

where IS represents the reverse saturation current of a transistor. Thus, we have $$ISVx = I_{r2} \cdot 2^{-SVx} \qquad (4)$$

Thus, representing the resistance of the resistor 164 by RSV, the voltage VSVx applied to the non-inverting input of the comparator 171 is obtained as follows:
$$VSVx = V_{r3} + RSV \cdot I_{r2} \cdot 2^{-SVx} \qquad (5)$$

A portion of light from an object being photographed which is reflected by the surface of the first shutter blind and the film surface is converted into a photocurrent by the light receiving element 38, and begins to be integrated by the capacitor 152 as a result of turning the analog switch 153 off when terminal B4 assumes "L" level at the end of the upward movement of the mirror or when the first shutter blind begins its running. Thus, representing the capacitance of the capacitor 152 by $C_1$, the output voltage VD1 from the amplifier 151 is as follows:

$$VD1 = V_{r3} + (I_0t/C_1) \cdot 2^{(BVx - AVx)} \qquad (6)$$

where $I_0$ represents a constant and t an integrating interval.

The comparator 171 compares the VSVx against the VD1 and turns the second blind controlling transistor 177 off when the equality VDI=VSVx is reached. Thereupon, terminal B3 assumes "H" level, and the electromagnet 50 is deenergized, allowing the second shutter blind to begin its running.

Assuming that VDI=VSBx and utilizing the equality $t=2^{-TVx}$, we have $$(I_0/C_1) \cdot 2^{BVx - AVX - TVx} = RSV \cdot I_{r2} \cdot 2^{-SVx} \qquad (7)$$

and using the relationship $(I_0/C_1)=RSV \cdot I_{r2}$, the basic apex equation is derived:

$$BVx+SVx=AVx+TVx \qquad (8)$$

Thus, VSVx is seen to represent a voltage used in the decision of an exposure. The exposure is controlled in this manner.

A program shift operation will now be described with reference to a flowchart shown in FIG. 12. The processing operation for the calculation begins with step #1 and the circuit mentioned above functions to deliver $AV_L$ representing an open F-value and $AV_H$ representing a minimum F-value of the lens from the F-value delivery circuit 43 disposed within the lens barrel 31 into CPU 41 at step #2. A combination of $AV_L$, $AV_H$ both written into CPU 41, and a minimum shutter speed of $TV_L$ and a maximum shutter speed $TV_H$ both contained in ROM defines an extent, shown as enclosed by broken lines in FIG. 14, in which the exposure period and the diaphragm aperture respond to EV value (hereafter, such extent will be referred to as "exposure interlocked extent").

Figure 14:
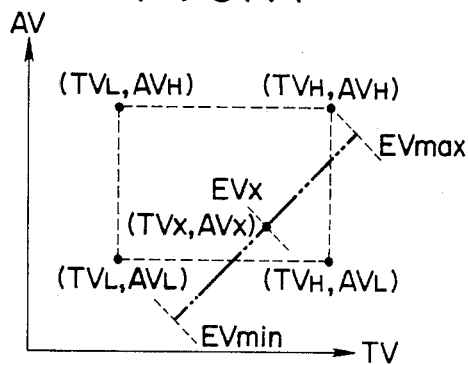
FIG. 14 is a diagram which illustrates constants of a program response and an associated extent of exposure interlock.

At step #3, an initial value Px0 for the constant Px of the program response shown in phantom line in FIG. 14 is transferred from ROM to RAM. By utilizing the definition:

$$Px=TVx-AVx \qquad (9)$$

a program response such as a rectilinear portion $P_{r2}$ mentioned in connection with FIG. 3a which passes through TV=7 and AV=3 will be given by Px0=4, which is previously stored in RAM. When it is transferred to ROM at step #3, there results that Px=4. The operation then proceeds to step #4 where a digital version of the brightness BVx of an object being photographed which is determined in the manner mentioned above is stored in RAM. Then follows step #5 where a conversion of DX code (ISO information) into SVx is effective to store film speed SVx in RAM. At step #6, EV value (EVx) is calculated from BVx, $AV_L$ and SVx. In the APEX calculation, the following equality applies generally;

$$EV=BV+SV=TV+AV \qquad (10)$$

It is to be noted that BV which appears in the equation (10) represents the brightness of an object being photographed as determined before passing through the diaphragm 34 while BVx represents the brightness of an object being photographed as determined after passage through the open-diaphragm $AV_L$. Accordingly, $$BV=BVx+AV_L \qquad (11)$$

The calculation of EV value (EVx) at step #6 is made as follows:

$$EVx=BVx+AV_L+SVx \qquad (12)$$

At step #7, EV value (EVx), the constant Px for the program response and the exposure period TVx and the diaphragm aperture AVx which are determined on the basis of $AV_L$, $AV_H$, $TV_L$ and $TV_H$ are available. The programmed calculation which takes place at step #7 will be described in detail with reference to a flowchart shown in FIG. 15.

During the programmed calculation, it is initially determined at step #20 to see whether EVx is or is not less than $(TV_L+AV_L)$ or lower limit $EV_{min}$ (see FIG. 14) of the exposure interlocked extent. If it is less, $AV_L$ contained in RAM is transferred to AVx at step #21, and $TV_L$ contained in ROM is transferred to TVx in RAM at step #22. This establishes that $AVx=AV_L$, and $TVx=TV_L$. If EVx is greater than the lower limit, the operation proceeds to step #23 where it is determined if EVx is or is not greater than $(TV_H+AV_H)$ or the upper limit $EV_{max}$ (see FIG. 14) of the exposure interlocked extent. If it is greater, $AV_H$ contained in RAM is transferred to AVx at step #24, and $TV_H$ in ROM is transferred to TVx in RAM at step #25. This establishes that $AVx=AV_H$ and $TVx=TV_H$. If EVx is less than the upper limit, the operation proceeds to step #26 where TVx is calculated from EVx and Px. By defining such that $$TVx=(\tfrac{1}{2})(EVx+Px) \qquad (13)$$

when Px=4 for the program response PR shown in FIG. 3A, for example, it follows from the equation (13) that TVx=5.5 for EVx=7. The operation then proceeds to step #27 where $AVx=EVX-TVx$ is used to find AVx=1.5. The operation then proceeds to step #28 where it is determined if AVx is less than $AV_L$. In the present embodiment, AVx=1.5 and $AV_L=2$, or $AVx<AV_L$. Accordingly, the operation proceeds to step #29 where it is established that $AVx=AV_L=2$. At following step #30, it is determined that TVx=5, using the equation $TVx=EVx-AVx$. This operating point corresponds to the point PT shown in FIG. 3A. Steps #26 and #27 temporarily calculate TVx, AVx according to a program response Px from the lower limit of the exposure interlocked extent which is defined by $TV_L$, $AV_L$ to the upper limit $EV_{max}$ of the exposure interlocked extent which is defined by $TV_H$, $AV_H$, as indicated by phantom lines in FIG. 14. Similar calculation of TVx and AVx is performed for an EV value in which the diaphragm is at its open limit or $AV_L$ and the exposure period varies in accordance with the EV value at steps #28 to #30, for an EV value in which the diaphragm aperture is at its minimum value $AV_H$ and the exposure period varies in accordance with the EV value at steps #28, #32, #33 and #30, for an EV value in which the exposure period is at its minimum speed limit $(TV_L)$ and the diaphragm aperture varies according to the EV value at steps #28, #32, #34 to #36, and for an EV value in which the exposure period is at its maximum speed limit $(TV_H)$ and the diaphragm apertures varies according to the EV value at steps #28, #32, #34, #37, #38 and #36. For an EV value in which the exposure period and the diaphragm aperture both vary according to the EV value, the program proceeds through steps #28, #32, #34 and #37 and then returns. The values calculated at steps #26 and #27 directly represent TVx and AVx.

As described, TVx and AVx are derived in terms of the EV value (EVx) and the constant Px of the program response. For example, for Px=4, TVx and AVx lie on the program response Pr comprising rectilinear portions $P_{r1}$, $P_{r2}$ and $P_{r3}$ as shown in FIG. 3A. Upon completion of the series of programmed calculations as mentioned above, the program returns to the flowchart shown in FIG. 12, entering at step #8. At step #8, data TVD1 to TVD4 representing exposure periods which are stored in ROM at addresses $60 to $BF as indicated in Table 5 are indexed on the basis of TVx contained in RAM at address $5.

TABLE 5

| (ROM) address | 7 | 6 | 5 | 4 | 3 | 2 | 1 | 0 | bit |
|---|---|---|---|---|---|---|---|---|---|
| $5D | | | | | $TV_L$ | | | | |
| $5E | | | | | $TV_H$ | | | | |
| $5F | | | | Pxo (initial value of Px) | | | | | |
| $60 ~ $BF | | | | $TV_{D1}$ ~ $TV_{D4}$ DECODE DATA | | | | | |
| $C0 ~ $DF | | | | $AV_{D1}$, $AV_{D2}$ DECODE DATA | | | | | |
| $E0 ~ $FF | | | | DX → SVx ENCODE DATA | | | | | |
| | 16 | 8 | 4 | 2 | 1 | ½ | ¼ | ⅛ | EV |

Figure 16:
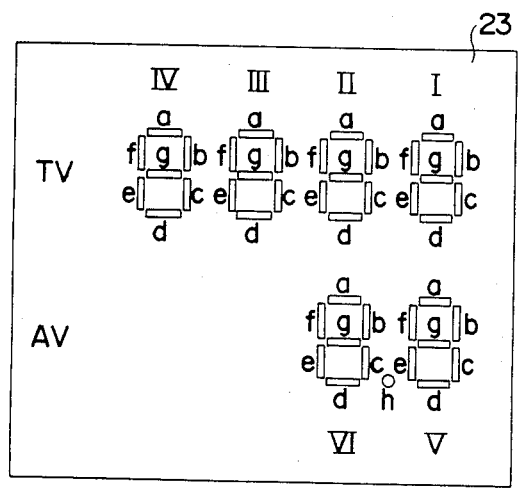
FIGS. 16 and 17 are enlarged plan views of display elements shown in FIG. 4 and their display patterns.

Data TVD1 to TVD4 which represent exposure periods are used to provide a display of a maximum of four digits I to IV in a 7 segment form using character segments a to g, as indicated in FIG. 16, and thus comprise 8 bits by 4 words corresponding to TVx value. Data TVD1 to TVD4 contained in ROM are transferred to RAM at addresses $8 to #B (see Table 2) with content indicated in Table 6 below.

TABLE 6

| $TV_{D1}$ | I | | | | | | |
| | a | b | c | d | e | f | g |
| $TV_{D2}$ | II | | | | | | |
| | a | b | c | d | e | f | g |
| $TV_{D3}$ | III | | | | | | |
| | a | b | c | d | e | f | g |
| $TV_{D4}$ | IV | | | | | | |
| | a | b | c | d | e | f | g |
| $AV_{D1}$ | V | | | | | | |
| | a | b | c | d | e | f | g |
| $AV_{D2}$ | VI | | | | | | |
| | a | b | c | d | e | f | g | h |

At step #8, data AVD1 and AVD2 which represent diaphragm aperture values and contained in ROM at addresses $C0 to $DF are indexed using AVx contained in RAMm at address $6 (see Table 5). Data AVD1 and AVD2 are used to provide a display of a maximum of two digits V and VI selected from a to j in segmental form at digit positions which are less significant than the segments indicating the exposure period, as indicated in FIG. 16. It will be seen that such data corresponds to the value of AVx. Data AVD1 and AVD2 contained in ROM are transferred to RAM at addresses $C and $D (see table 2) with content indicated in Table 6.

On the other hand, TVD1 to TVD4 from RAM are delivered through terminal P10 of CPU 41 to the display element 23, and AVD1 and AVD2 are delivered through terminal P11 to the display element 23 also. Accordingly, the calculated TVx and AVx are numerically displayed on the display element 23 as the exposure period TV and diaphragm aperture AV, in a manner illustrated in FIG. 17. In an example shown in FIG. 17, the exposure period is equal to 1/30 second and the diaphragm aperture is equal to 2.0.

The operation then proceeds to step #16 where a complement for the number of diaphragm controlling steps ($DAV = AVx - AV_L$) is calculated. Upon completion of the processing operation at step #16, the operation proceeds to step #9 where data $AV_L$ and $AV_H$ are read from the lens barrel 31 in the similar manner as at step #2. The operation then proceeds to step #10 where it is determined if either up shift switch 22A or down shift switch 22B (see FIGS. 4 and 6) is depressed. If the up shift switch 22A is depressed and terminal P8 assumes "L" level, the operation proceeds to step #11. If the down shift switch 22B is depressed and terminal P9 assumes "L" level, the operation proceeds to step #12. If neither shift switch is depressed and hence both terminals P8 and P9 assume "H" level, the operation proceeds to step #4. It will be noted that the program which follows the step #4 has been mentioned above as deriving TVx and AVx on the basis of EVx and the constant Px of the program response.

The processing operation which begins with step #11 when the up shift switch 22A is depressed will be described first. At step #11, it is determined to see if $TVx \geq TV_H$ or $AVx > AV_L$. If the program response Pr is as indicated in FIG. 3C and TVx and AVx determined at steps #2 to #7 are located at point $PT_1$ in this Figure and $TVx = TV_H$, indicating the maximum shutter speed, it is impossible to shift the shutter speed toward a higher value. Hence, step #11 inhibits an up shift, and the operation proceeds to step #4. If TVx and AVx are located at point $PT_3$ in FIG. 3C and $AVx = AV_L$ (open diaphragm aperture), it is also impossible to shift the diaphragm aperture toward the open side. Accordingly, an up shift is also inhibited, and the operation proceeds to step #4.

When the program response Pr is as indicated in FIG. 3B, neither the relationship $TVx \geq TV_H$ nor $AVx > AV_L$ applies at all points on the program response Pr excluding the point ($TV_L$, $AV_L$) and the point ($TV_H$, $AV_H$), and hence it is possible to shift the exposure period toward a higher shutter speed and to shift the diaphragm aperture toward the open side. In other words, an up shift operation is enabled, and the operation proceeds to step #13. At step #13, the exposure period is shifted toward a smaller value while the diaphragm aperture is shifted toward the open side. Representing the number of steps through which the shift takes place by k, it will be seen that $(TVx + k)$ represents the TVx subsequent to the shift and $(AVx - k)$ represents AVx subsequent to the shift, both of which are derived from the relationship $EV = TV + AV$. In other words, the exposure period is shifted up through k steps while the diaphragm aperture is shifted down through k steps. By way of example, if $k = 1$, assuming that an exposure period is equal to 1/500 second ($TVx = 9$) and a diaphragm aperture is equal to F5.6 ($AVx = 5$), the step #13 changes the exposure period to 1/1000 ($TVx = 10$) and the diaphragm aperture to F4 ($AVx = 4$). When the exposure period and the diaphragm aperture are located at point $PT_1$ in FIG. 3B, the operation shifts to the point $PT_1'$. Similarly, a shift occurs from $PT_2$ to point $PT_2'$ or from point $PT_3$ to point $PT_3'$. The operation then proceeds to step #15 where the constant Px of the program response Pr is determined utilizing the TVx and AVx which prevail after the shift.

As mentioned previously $$Px = TVx - AVx \qquad (9)$$

it will be seen that in the subroutine of step #15, a calculation is made according to the following formula:

$$Px \leftarrow TVx - AVx \qquad (14)$$

For example, when the shutter period changed to 1/1000 second ($TVx = 10$) and the diaphragm aperture changed to F4 (AVx=4), there results that Px=6. The operation then proceeds to step #8 where the resulting exposure period and the diaphragm aperture are displayed. The operation then returns to step #9, and if neither up shift switch 22A nor down shift switch 22B is depressed, the operation proceeds through steps #10 to #4, to #5, to #6, and the programmed calculation takes place again at step #7. In the programmed calculation, the operation proceeds from step #20 to #23 as mentioned previously, and at step #26, using the constant Px which is derived at step #15, a calculation is made according to the following formula (see the equation (13)):

$$TVx \leftarrow (\tfrac{1}{2})(EVx + Px) \tag{15}$$

thus calculating a new value of TVx in the manner mentioned previously.

It will be appreciated that with a program response as shown in FIG. 14 which passes through TV=TVx and AV=AVx and in which TV and AV changes in the ratio of 1:γ with respect to a change in the EV value, $$AV - AVx = \gamma(TV - TVx) \tag{16}$$

Combining the equations (16) and (10), we have
$$TV = (EV + \gamma TVx - AVX)/(1 + \gamma) \tag{17}$$

Assuming that γ=1, indicating that the program response has an angle of inclination equal to 45°, we have from the equation (14)

$$TV = (\tfrac{1}{2})(EV + Px) \tag{18}$$

In the equation (18), TV represents an exposure period TVx which is desired to be obtained and EV represents EVx which is derived from the brightness of an object being photographed. Accordingly, by substituting TVx and EVx for TV and EV, respectively, the previous equation (13) is derived.

Thus, it will be seen that the equation (13) is a formula which may be used to obtain TVx corresponding to EVx on a program response Px which passes through a point (TVx, AVx) that has been shifted as a result of a shift operation and in which TV and AV changes in the ratio of 1:1 with respect to a change in the EV value. This could be illustrated in FIG. 3B by an up shift from the point $PT_1$ on the program response Pr, in which instance both TV and AV shift to the point $PT_1'$, and as the EV value changes, TV and AV follow a phantom line $P_{SU1}$ which passes through the point $PT_1'$. This means that the phantom line $P_{SU1}$ is established as a new program response. Similarly, a shift from the point $PT_2$ to point $PT_2'$ establishes a program response indicated by a phantom line $P_{SU2}$, and a shift from the point $PT_3$ to $PT_3'$ establishes a program response indicated by a phantom line $P_{SU3}$.

The processing operation which occurs at step #12 and subsequent steps when the down shift switch 22B is depressed will now be described. At step #12, it is determined to see if $TVx \leq TV_L$ or $AVx \geq AV_H$. If the program response Pr is as indicated in FIG. 3B, TVx and AVx as determined at steps #2 to #7 are located at the point $PT_1$ in this Figure and the equality $TVx = TV_L$ applies (indicating an exposure period corresponding to the minimum speed), it is impossible to shift the exposure priod toward a greater value. Accordingly, a down shift is inhibited at step #12, and the operation proceeds to step #4. If TVx and AVx are located at point $PT_3$ in FIG. 3B and $AVx = AV_H$ (indicating a minimum diaphragm aperture), it is impossible to shift the diaphragm aperture toward a smaller value. Accordingly, a down shift is inhibited, and the operation proceeds to step #4.

When the program response Pr is as indicated in FIG. 3C, it will be seen that neither the relationship $TVx \leq TV_L$ nor the relationship $AVx \geq AV_H$ applies at all points on the program response Pr except the point $(TV_L, AV_L)$ and the point $(TV_H, AV_H)$. Accordingly, it is possible to shift the exposure period to a greater value and to shift the diaphragm aperture to a smaller value, and a down shift is enabled and the operation proceeds to step #14 where such operation takes place. Representing a number of steps through which the shift occurs by k, (TVx−k) represents the TVx subsequent to the shift, and (AVx+k) represents AVx subsequent to the shift. In other words, the exposure period shifts down through the k steps while the diaphragm aperture shifts up through k steps. The operation then proceeds to step #15, and subsequent operation remains similar to that which occurs for an up shift operation. Consequently, as a result of a down shift operation, the operating point which represents the relationship between the exposure period and the diaphragm aperture will shift from point $PT_1$ to $PT_1'$ to establish a new program response indicated by a phantom line $P_{SD1}$, shift from point $PT_2$ to $PT_2'$ to establish a new program response indicated by a phantom line $P_{SD2}$, or shift from point $PT_3$ to $PT_3'$ to establish a new program response indicated by a phantom line $P_{SD3}$.

It will be seen from the foregoing description that the shift operation establishes a new program response as indicated by phantom lines $P_{SU1}$ to $P_{SU3}$ or $P_{SD1}$ to $P_{SD3}$, shown in FIGS. 3B or 3C, respectively, but it is to be noted that the program response is defined between the lower limit $EV_{min}$ and the upper limit $EV_{max}$ (see FIG. 14) of the exposure interlocked extent, and is used to determine TVx temporarily at step #26. Subsequent processing operation determines TVx and AVx so that they remain within the exposure interlocked extent of the exposure period and the diaphragm aperture (indicated by a broken line enclosure in FIG. 14). In this manner, a shifted program response as indicated by phantom line $P_{SD}$ shown in FIG. 3A is defined.

Figure 12:
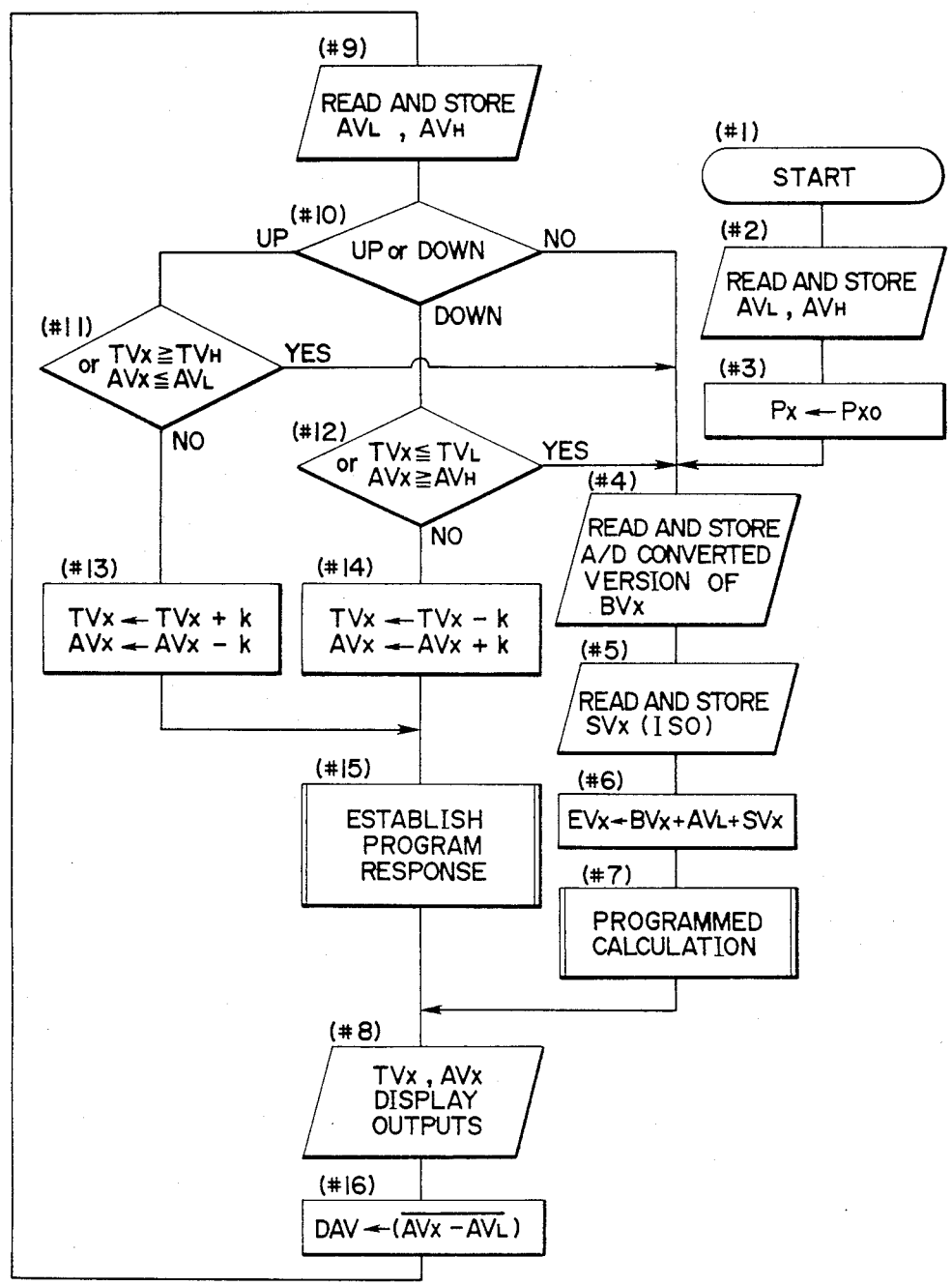
FIGS. 12 and 13 are flowcharts which illustrate the operation of the CPU shown in FIG. 6.
Figure 13:
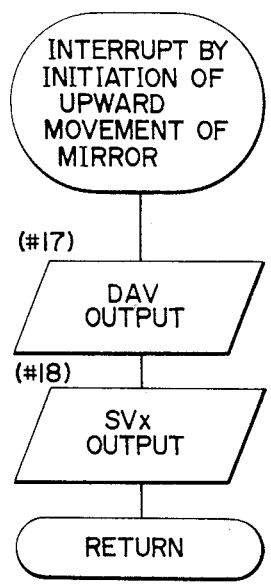

It is to be noted that the operation according to the flowchart shown in FIG. 12 repeats itself before the movable mirror begins its upward movement. However, when the switch 45 is turned on, an interrupt operation shown in FIG. 13 takes place. Specifically, the number of diaphragm controlling steps DAV obtained at step #16 is delivered at step #17, and film speed SVx which is read at step #5 is delivered at step #18, and an exposure control is based on these parameters.

In the first embodiment described above, according to a program response which is established as a result of shift, both the exposure period and the diaphragm aperture changes through 0.5 step at the same rate with respect to a one step change in the EV value. Hence, if a desired value for the exposure period or diaphragm aperture is preset by the shift operation, an extreme deviation of the exposure period and the diaphragm aperture from a desired value can be prevented if the EV value changes slightly. While a decision cannot be made on the part of the camera if this is a shift which is performed intentionally by a photographer to provide a shutter effect or a diaphragm effect, the establishment of a program response in the manner mentioned above effectively prevents any extreme change in either the exposure period or diaphragm aperture in response to a change in the EV value.

Figure 20A:
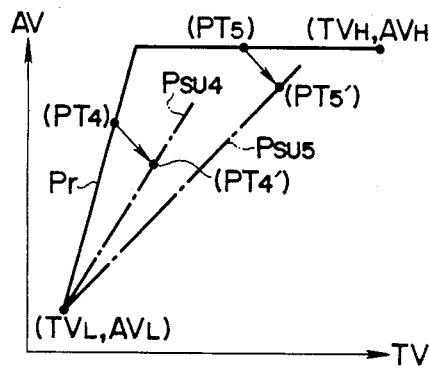
FIGS. 20A and 20B graphically show responses for an up shift and a down shift according to a second embodiment of the invention.
Figure 20B:
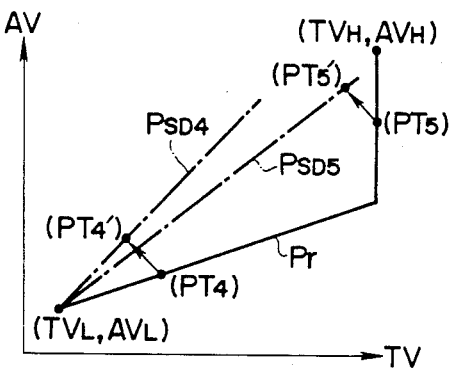

The first embodiment has been described assuming an identical inclination for the program responses before and after the shift. However, the inclination of the program response which is established after a shift can be changed as illustrated in FIGS. 20A and 20B. FIGS. 20A and 20B illustrate the establishment of a program response according to a second embodiment of the invention. FIG. 20A illustrates an exposure period and a diaphragm value as well as a change in the program response which is established as a result of an up shift operation. The program response Pr which prevails before the up shift passes through point ($TV_L$, $AV_L$), and changes the exposure period and the diaphragm aperture at predetermined rates which depends on the EV value. Assuming that an exposure period and a diaphragm aperture are located at point $PT_4$ before an up shift, the exposure period will shift toward a smaller value and the diaphragm aperture will shift toward the open side as indicated by a point $PT_4'$ and a new program response will be indicated by a rectilinear line $P_{SU4}$ joining point ($TV_L$, $AV_L$) and point $PT_4'$. If an exposure period and a diaphragm aperture are located at point $PT_5$ before an up shift, the exposure period and the diaphragm aperture will shift to point $PT_5'$ and a new program response will be indicated by a rectilinear line $P_{SU5}$ which joins point ($TV_L$, $AV_L$) and point $PT_5'$. FIG. 20B illustrates an exposure period and a diaphragm value as well as a change in the program response which are established as a result of a down shift. If an exposure period and a diaphragm aperture are located at point $PT_4$ before a down shift, the exposure period and the diaphragm aperture will shift to point $PT_4'$ and a new program response will be indicated by a rectilinear line $P_{SD4}$ which joins point ($TV_L$, $AV_L$) and point $PT_4'$. If an exposure period and a diaphragm aperture are located at point $PT_5$ before a down shift, the exposure period and the diaphragm aperture will shift to point $PT_5'$ and a new program response will be indicated by a rectilinear line $P_{SD5}$ which joins point ($TV_L$, $AV_L$) and point $PT_5'$.

Figure 15:
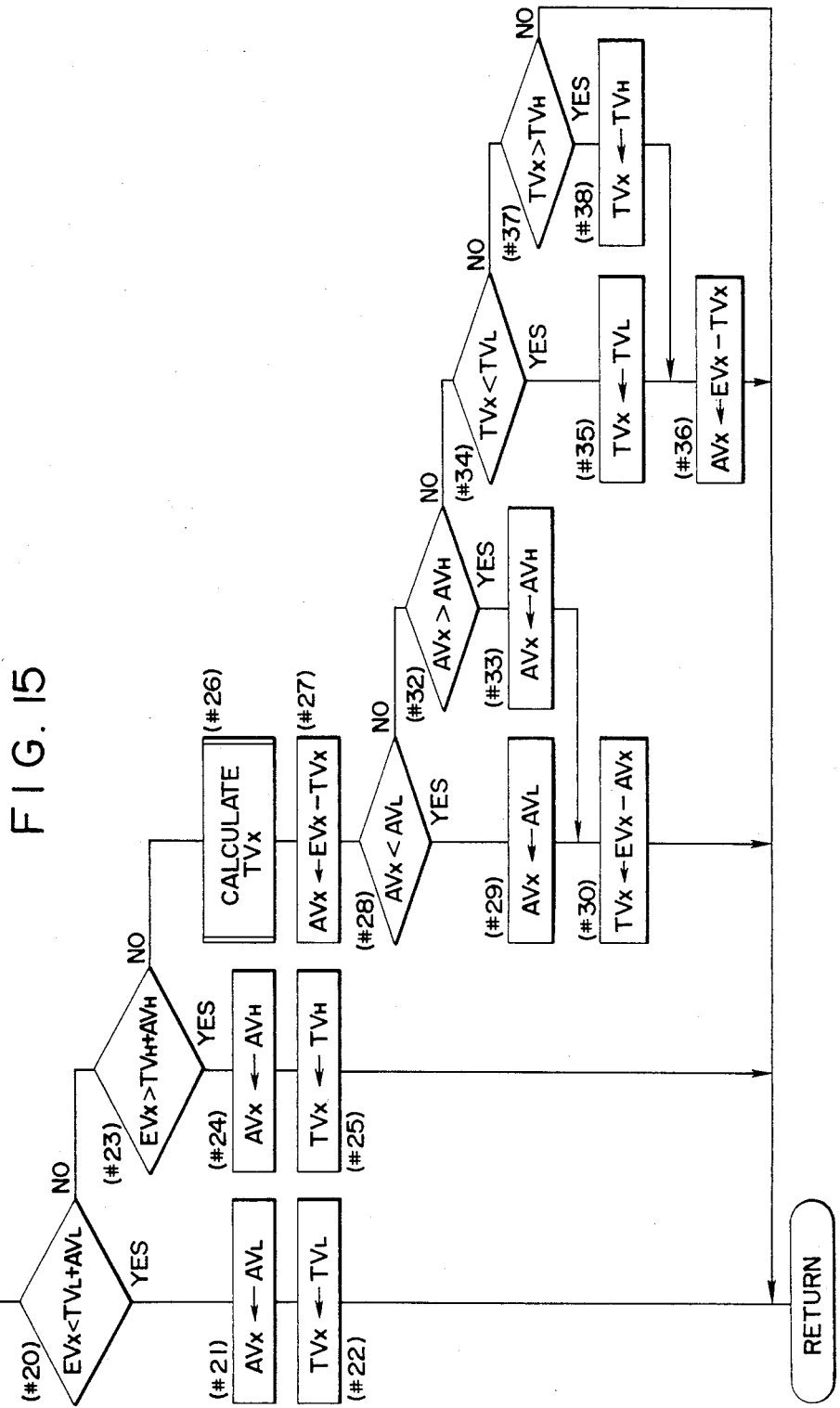
FIG. 15 is a flowchart of a programmed calculation which is used in a subroutine shown in FIG. 12.

An apparatus which carries out the method of establishing the program response according to the second embodiment illustrated in FIGS. 20A and 20B is constructed generally in a manner similar to that shown in FIGS. 4 to 8, and the programmed operation by CPU 41 may be similar to that of the first embodiment except that the constant Px of the program response is defined as follows:

$$Px = (AVx - AV_L)/(TVx - TV_L) \tag{19}$$

and the subroutine which takes place at step #15 shown in the flowchart of FIG. 12 is constructed to perform the following calculation:

$$Px \leftarrow (AVx - AV_L)/(TVx - TV_L) \tag{20}$$

together with another modification associated with the programmed calculation at step #7 in which the calculation of TVx at step #26 shown in the flowchart of FIG. 15 is made according to the following formula:

$$TVx \leftarrow (EVx + Px \cdot TV_L - AV_L)/(1 + Px) \tag{21}$$

In other respects, the arrangement is quite similar to the previous embodiment.

It will be noted that the equation (19) is equal to the inclination of a rectilinear line which passes through point (TVx, AVx) and point ($TV_L$, $AV_L$) or $\gamma$ appearing in the equation (16). Accordingly, replacing $\gamma$ in the equation (17) by Px, we have $$TV = (EV + Px \cdot TVx - AVx)/(1 + Px) \tag{22}$$

Similarly, from the equation (17), we have $$TV = (EV + Px \cdot TV_L - AV_L)/(1 + Px) \tag{23}$$

Since EV represents EVx derived at steps #4 to #6 (see FIG. 12) and TV represents an exposure period TVx which is desired to be obtained, it follows that the equation (21) is derived. Thus, in this embodiment, a calculation of TVX←(TVx+k) and AVx←(AVx−k) is performed in response to an up shift, and a calculation of TVx←(TVx−k) and AVx←(AVx+k) is performed in response to a down shift, to thereby change the exposure period and the diaphragm aperture, with a new program response being established so as to pass through point (TVx, AVx) and point ($TV_L$, $AV_L$).

According to the second embodiment, when the exposure period is shifted toward a smaller value and the diaphragm aperture is shifted toward the open side in response to an up shift operation, a new program response will be established automatically so as to have a reduced angle of inclination $\gamma$, thus allowing the exposure period to change while maintaining the diaphragm aperture at a value toward the open side in the presence of a change in the EV value. Conversely, when the exposure period is shifted to a greater value and the diaphragm aperture is shifted toward a minimum aperture in response to a down shift operation, a new program response will be established automatically with an increased angle of inclination $\gamma$, allowing the diaphragm aperture to change while maintaining the exposure period at a greater value in the presence of a change in the EV value.

The establishment of a program response according to a third embodiment will now be described with reference to FIGS. 21A and 21B. In this instance, the constant Px of the program response is defined as follows:

$$Px = TVx \tag{24}$$

At step #15 (see FIG. 12), a calculation is made on the basis of the equation (24) as follows:

$$Px \leftarrow TVx \tag{25}$$

In the programmed calculation at step #7, step #26 (see FIG. 15) is modified to perform a calculation as follows:

$$TVx \leftarrow Px \tag{26}$$

As a result of such arrangement, at step #27 shown in FIG. 15, a calculation is made to determine diaphragm aperture AVx with predominating exposure period, using an exposure period TVx which is obtained subsequent to the shift operation. In the event the resulting diaphragm aperture AVx goes out of the exposure interlocked extent for the diaphragm, ($AV_L < AVx < AV_H$), the operation which begins with step #28 re-calculates an exposure period TVx so that it resumes the exposure interlocked extent. Accordingly, the program response will be defined as illustrated in FIGS. 21A and 21B.

Figure 21A:
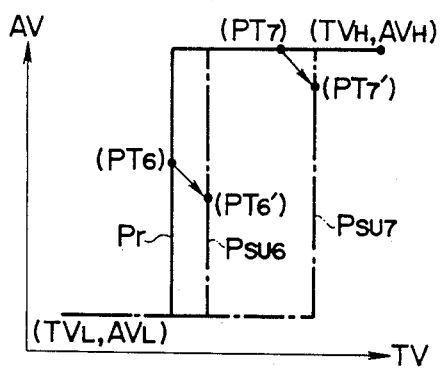
FIGS. 21A and 21B graphically show responses for an up shift and a down shift according to a third embodiment of the invention.
Figure 21B:
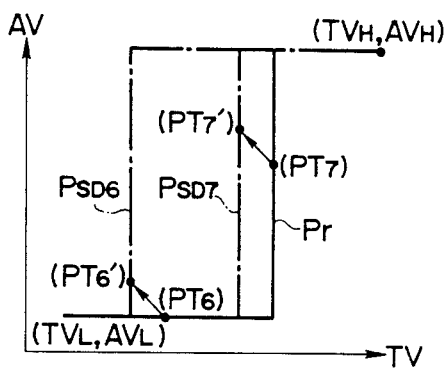

In FIG. 21A, if an exposure period and a diaphragm aperture are located at point $PT_6$ on the program response Pr before the up shift and is shifted to point $PT_6'$, a new program response will be established as indicated by a phantom line $P_{SU6}$. An up shift from point $PT_7$ to point $PT_7'$ results in establishing a new program response as indicated by a phantom line $P_{SU7}$. If an exposure period and a diaphragm aperture are located at point $PT_6$ on the program response before a down shift operation in FIG. 21B, it shifts to point $PT_6'$ and a new program response will be established as indicated by a phantom line $P_{SD6}$. A down shift from point $PT_7$ to point $PT_7'$ establishes a new program response as indicated by a phantom line $P_{SD7}$. Thus, according to the third embodiment, a so-called shutter predominating exposure can be achieved in which only the diaphragm aperture changes in response to the EV value when a desired exposure period is established at the time of the shift operation.

As described, in each of the first to the third embodiments, (1) an up shift operation causes an exposure period to shift toward a smaller value through a given number of steps (k) while a diaphragm aperture shifts toward the open side through the given number of steps (k); (2) a down shift operation causes an exposure period to shift toward a greater value through a given number of steps (k) and causes a diaphragm aperture to shift toward a smaller value through the given number of steps (k); (3) a new program response including a combination of changed exposure period and diaphragm aperture is established in response to either an up shift or down shift operation; and (4) if either an exposure period or a diaphragm aperture goes beyond the limit of the exposure interlocked extent as a result of an up shift or down shift operation, a shift then takes place which establishes either one of them at the limit while maintaining the other within the exposure interlocked extent.

Figure 17:
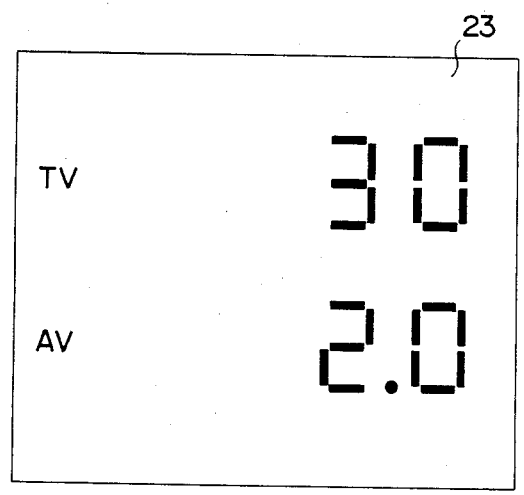

It will be understood that in an apparatus which establishes a program response according to one of the described embodiments, an exposure period and a diaphragm aperture which are used during an exposure are both transmitted to a photographer through the display element 23 (see FIGS. 4, 16 and 17). However, it will be appreciated only one of them may be displayed since it is a measure of an exposure process and is responsive to a shift operation.

A technique to control a shutter and a diaphragm during an exposure process based on the displayed values of the exposure period and the diaphragm aperture are well known in the art. As shown in FIG. 6, a diaphragm may be controlled during an exposure process on the basis of displayed values of the exposure period and the diaphragm aperture, and the initiation of running of the second shutter blind may be controlled in response to light from an object being photographed which is reflected from the first shutter blind surface and the film surface after such light has passed through the actual diaphragm, without departing from the scope and spirit of the invention.

In each embodiment described, a program response changes in various manners from an initial value, Px0, of the constant of the program response which is stored in ROM of CPU 41, as a result of shift operations. Accordingly, it is possible to compare the prevailing constant Px against the initial value Px0 of the program response and to provide an alarm whenever they are unequal to each other, indicating to the effect that the program response has been shifted and to interrupt the alarm when they are equal. However, if this is implemented in a simple manner, the alarm remains effective if the exposure period and the diaphragm aperture are returned to the point PT by an up shift operation after a down shift operation has taken place from the point PT on the program response which is initialized, because the resulting program response will not return to Pr, as illustrated in FIG. 3A. Such result will occur when either an exposure period or a diaphragm aperture is shifted from one limit and then returned to the limit by a shift operation in the opposite direction. This aspect is illustrated in FIGS. 18A and 18B.

Figure 18A:
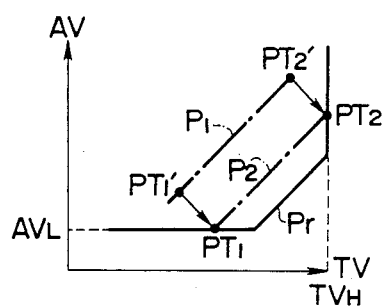
FIGS. 18A and 18B graphically illustrate a resetting to an initial program response subsequent to an up shift or down shift.
Figure 18B:
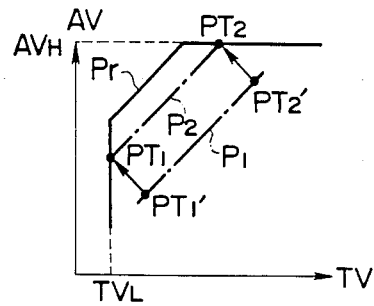

In FIGS. 18A and 18B, when an exposure period and a diaphragm aperture are changed from either point $PT_1$ or $PT_2$ on an initialized program response Pr to a point $PT_1'$ or point $PT_2'$ in response to a down shift operation to thereby establish a new program response P1, a subsequent up shift operation to return the exposure period and the diaphragm value from point $PT_1'$ or point $PT_2'$ to point $PT_1$ or point $PT_2$, respectively, results in establishing a program response P2 which is different from the initial program response Pr. Accordingly, the exposure period and the diaphragm aperture will change along the program response P2 in response to a change in the EV value, resulting in a failure to re-establish the program response Pr. Similarly, referring to FIG. 18B, when an exposure period and a diaphragm value are shifted from either point $PT_1$ or point $PT_2$ on the initialized program response Pr to a point $PT_1'$ or a point $PT_2'$ in response to an up shift, a subsequent down shift operation to return to the point $PT_1$ or $PT_2$ result in a change in the program response along Pr→P1→P2, again resulting in a failure to re-establish the initial program response Pr.

Figure 19:
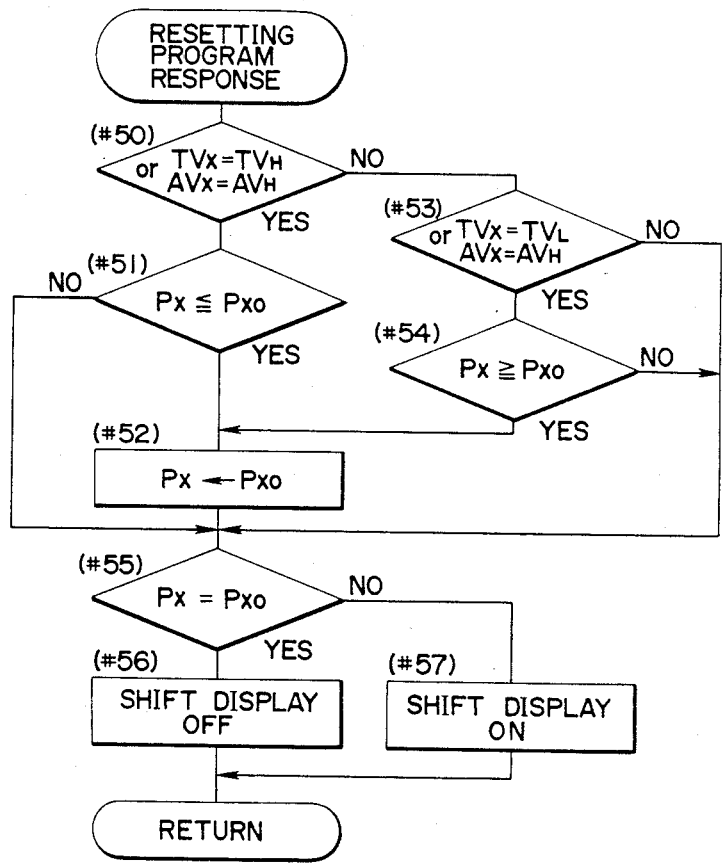
FIG. 19 is a flowchart of a resetting operation illustrated in FIGS. 18A and 18B.

When the exposure period and the diaphragm aperture have been returned to the initial program response after a shift operation has taken place, it is possible to remove a shift alarm and to re-initialize the program response Pr. FIG. 19 shows a flowchart of the operation which is used at this end, and represents a reset operation which follows step #15 shown in FIG. 12 in which the program response is established. Describing the flowchart shown in FIG. 19, it is initially determined at step #50 to see if $TVx=TV_H$ (indicating a maximum shutter speed) or $AVx=AV_L$ (indicating the open limit of the diaphram aperture). If Yes, the operation proceeds to step #51 while if No, the operation proceeds to step #53. At step #51, it is examined to see if the constant Px of the program response is less than an initial value Px0. If Px≦Px0, the operation proceeds to step #52 where Px=Px0 is established, thus initializing the program response. At step #53, it is examined to see if $TVx=TV_L$ (indicating a minimum shutter speed) or $AVx=AV_H$ (a minimum diaphragm aperture). If Yes, the operation proceeds to step #54 where it is determined whether the constant Px of the program response is greater than the initial value Px0. If Px≧Px0, the operation proceeds to step #52 where Px=Px0 is established. Subsequently, or if it is found at step #51 that the constant Px is greater than the initial value Px0 or if it is found at step #54 that the constant Px is less than the initial value Px0, the operation proceeds to step #55. If it is found at step #55 that Px=Px0, the shift alarm is removed at step #56. If Px≠Px0, a shift alarm is generated. Subsequently, the operation proceeds to step #8 (see FIG. 12).

Figure 22:
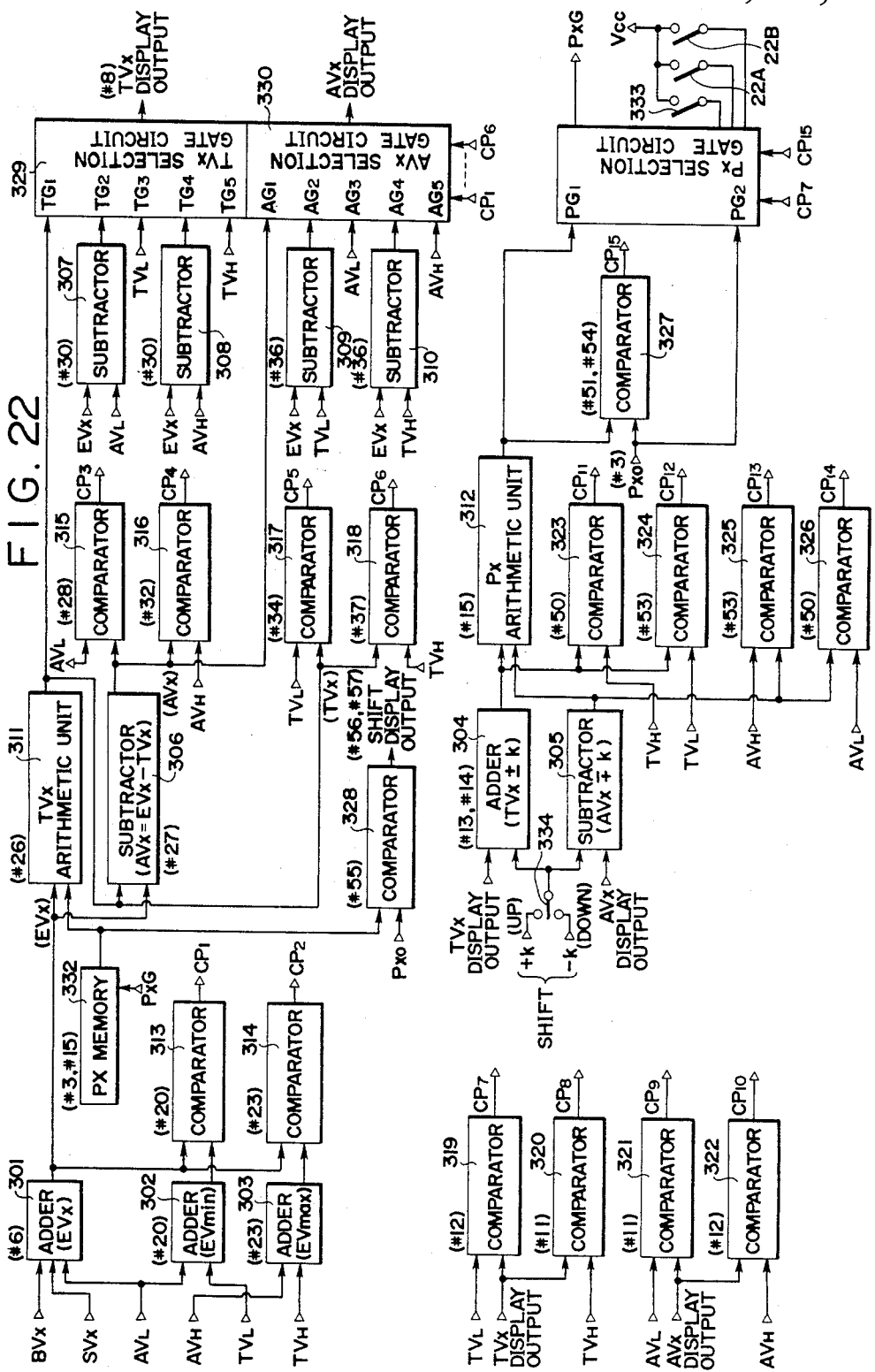
FIG. 22 is a block diagram of a different form of electrical circuit which may be employed according to the invention.
Figure 23:
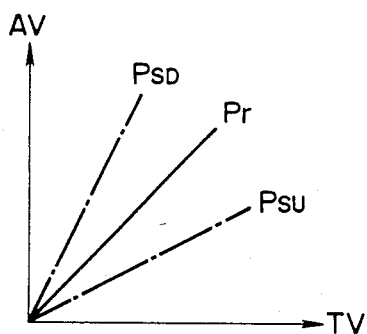
FIGS. 23 and 24 graphically show responses which are used in the prior art.
Figure 24:
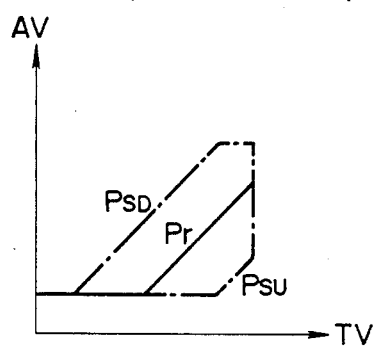

An apparatus for implementing a program shift according to the invention may utilize a CPU as described in the embodiment, but alternatively, may employ an electrical circuit as shown in FIG. 22, for example. The electrical circuit shown in FIG. 22 comprises adders 301 to 304, subtractors 305 to 310, arithmetic units 311 and 312, comparators 313 to 328, TVx, AVx, and Px selection gate circuits 329 to 331, Px memory circuit 332, the up shift switch 22A, the down shift switch 22B, a reset switch 333 and a shift changing switch 334. In FIG. 22, various signals and step numbers (#) shown correspond to the signals and the steps illustrated in the flowcharts of FIGS. 12, 15 and 19.

The display of exposure period TVx takes place by selecting values fed to gates TG1 to TG5 within TVx selection gate circuit 329 in accordance with outputs CP1 to CP6 from comparators 313 to 318. The display of diaphragm aperture AVx takes place by selecting the values fed to gates AG1 to AG5 within AVx selection gate circuit 330 in accordance with outputs CP1 to CP6 from the comparators 313 to 318. The relationship between the outputs CP1 to CP6 from the comparators 313 to 318 and the selected values is illustrated in Table 7 below.

TABLE 7

| outputs from comparators 313 to 318 | | | | | | selection gates 329, 330 | upside: exposure period (TVx) downside: diaphragm aperture (AVx) |
|---|---|---|---|---|---|---|---|
| CP1 | CP2 | CP3 | CP4 | CP5 | CP6 | | |
| L | L | L | L | L | L | TG1 | f (EVx, Px) |
|   |   |   |   |   |   | AG1 | EVx - TVx |
| H | — | — | — | — | — | TG3 | $TV_L$ |
|   |   |   |   |   |   | AG3 | $AV_L$ |
| — | H | — | — | — | — | TG5 | $TV_H$ |
|   |   |   |   |   |   | AG5 | $AV_H$ |
| L | L | H | L | — | — | TG2 | $EVx - AV_L$ |
|   |   |   |   |   |   | AG3 | $AV_L$ |
| L | L | L | H | — | — | TG4 | $EVx - AV_H$ |
|   |   |   |   |   |   | AG5 | $AV_H$ |
| L | L | L | L | H | L | TG3 | $TV_L$ |
|   |   |   |   |   |   | AG2 | $EVx - TV_L$ |
| L | L | L | L | L | H | TG5 | $TV_H$ |
|   |   |   |   |   |   | AG4 | $EVx - TV_H$ |

A function f of Px and EVx which is calculated to the TVx arithmetic unit 311 is fed to gate TG1; $(EVx-AV_L)$ calculated in the subtractor 307 is fed to gate TG2; $TV_L$ is fed to gate TG3; $(EVx-AV_H)$ calculated in the subtractor 308 is fed to gate TG4; and $TV_H$ is fed to gate TG5 of the TVx selection gate circuit 329. AVx or $(EVx-TVx)$ calculated in the subtractor 306 is fed to gate AG1; $(EVx-TV_L)$ calculated in the subtractor 309 is fed to gate AG2; $AV_L$ is fed to gate AG3; $(EVx-TV_H)$ calculated in the subtractor 310 is fed to gate AG4; and $AV_H$ is fed to gate AG5 of the AVx selection gate circuit 330. EVx is calculated in the adder 301 by adding BVx, SVx and $AV_L$ together. $EV_{min}$ and $EV_{max}$ which are used to obtain outputs CP1 and CP2 from the comparators 313, 314 are obtained by adding $AV_L$ and $TV_L$ in the adder 302 and by adding $AV_H$ and $TV_H$ together in the adder 303. A shift display output is obtained as a result of a comparison of the constant Px of the program response which is stored in the Px memory circuit 332 against Px0 in the comparator 328.

The constant Px of the program response is delivered from the Px selection gate circuit 331 by selecting either gate PG1 or PG2 therein in accordance with outputs CP7 to CP15 from the comparators 319 to 327, the reset switch 333 which is turned on when the power is applied and the particular shift switch (either the up shift switch 22A or down shift switch 22B), and is stored in the Px memory circuit 332. The relation therebetween is indicated in Table 8 below.

TABLE 8

| outputs from comparators 319 to 327 | | | | | | | | | switch 333 | switch 22A | switch 22B | gate 331 | No. |
|---|---|---|---|---|---|---|---|---|---|---|---|---|---|
| CP7 | CP8 | CP9 | CP10 | CP11 | CP12 | CP13 | CP14 | CP15 | | | | | |
| — | — | — | — | — | — | — | — | — | H | — | — | PG2 | 1 |
| — | — | — | — | — | — | — | — | — | L | L | L | none | 2 |
| — | H | — | — | — | — | — | — | — | L | H | L | none | 3 |
| — | — | H | — | — | — | — | — | — | L | H | L | none | 4 |
| H | — | — | — | — | — | — | — | — | L | L | L | none | 5 |
| — | — | — | H | — | — | — | — | — | L | L | H | none | 6 |
| — | L | L | — | H | — | — | — | H | L | H | L | PG2 | 7 |
| — | L | L | — | — | — | H | H | — | L | H | L | PG2 | 8 |
| L | — | — | L | — | H | — | — | L | L | L | H | PG2 | 9 |
| L | — | — | L | — | — | H | — | L | L | L | H | PG2 | 10 |
| — | L | L | — | L | — | — | L | — | L | H | L | PG1 | 11 |
| L | — | — | L | — | L | L | — | — | L | L | H | PG1 | 12 |

Describing Table 8 in the order of the row number indicated in the rightmost column, it will be seen that at row No. 1, gate PG2 is selected in response to the power being turned on, whereby the initial value Px0 is stored in the Px memory circuit 332. At row No. 2, neither shift switch 22A nor 22B is depressed, and hence the content of the memory circuit 332 remains unchanged. At row No. 3, $TVx \geq TV_H$, thus inhibiting an up shift operation while maintaining the content of the memory circuit 332 unchanged. At row No. 4, $AVx \leq AV_L$, thus inhibiting an up shift operation while maintaining the content of the memory circuit 332 unchanged. At row No. 5, $TVx \leq TV_L$, thus inhibiting a down shift operation while maintaining the content of the memory circuit 332 unchanged. At row No. 6, $AVx \geq AV_L$, thus inhibiting a down shift operation while maintaining the content of the memory circuit 332 unchanged. At row No. 7, when the up shift switch 22A is depressed while the up shift operation is enabled, there follows $TVx = TV_H$ and $Px \leq Px0$, and accordingly the initial value Px0 is stored in the memory circuit 332. At row No. 8, when the up shift switch 22A is depressed while the up shift operation is enabled, there follows that $AVx = AV_L$ and $Px \leq Px0$, whereby the initial value Px0 is stored in the memory circuit 332. At row No. 9, when the down shift switch 22B is depressed while the down shift operation is enabled, there follows that $TVx = TV_L$ and $Px \geq Px0$, whereby the initial value Px0 is stored in the memory circuit 232. At No. 10, when the down shift switch 22B is depressed while the down shift operation is enabled, there follows that $AVx \fallingdotseq AV_H$ and $Px \geq Px0$, whereby the initial value Px0 is stored in the memory circuit 332. At row No. 11, when an up shift operation occurs during the time it is enabled, there follows that $TVx \neq TV_H$ and $AVx \neq AV_L$, whereby Px which is calculated in the Px arithmetic unit 312 is stored in the memory circuit 332. At row No. 12, a down shift operation when it is enabled results in that $TVx \neq TV_L$ and $AVx \neq AV_H$, whereby Px which is calculated in the Px arithmetic unit 312 is stored in the memory circuit 332.

What is claimed is:

1. A method of establishing a program exposure response of a camera having a shift operating member for shifting from a point along a preset program response contained in a memory to another point along another program response, the shift value also being stored in memory, comprising the steps of:

determining a point, representing at least one exposure controlling value, on a first preset program response comprising a combination of an exposure period and a diaphragm aperture which is determined by an EV value as a function of the brightness of an object being photographed and a film speed and being represented in terms of a constant which depends on the relationship between the exposure period and the diaphragm aperture;

shifting the combination of the exposure period and the diaphragm aperture through a given number of steps in a direction to maintain an equivalent EV value as the exposure control value at said point responsive to the operation of the shift operation member through a like member of steps;

setting a second program response including the exposure control value comprising a combination of the exposure period and the diaphragm aperture which are obtained subsequent to the shift operation and separated from the first program response;

and determining a combination of subsequent exposure period and diaphragm aperture values along the second program response in accordance with an EV value.

2. A method according to claim 1 in which the program response is defined between a lower limit and an upper limit of an exposure interlocked extent in which an exposure period and a diaphragm aperture depends on an EV value.

3. A method according to claim 1 in which whenever either an exposure period or diaphragm aperture goes beyond the exposure interlocked extent as a result of an operation of the shift operating member, a shift operation takes place in which one of said exposure period or diaphragm aperture values are established at either limit value while the other is chosen to be within the exposure interlocked extent.

4. A method according to claim 1 in which when a shift operation is repeated from a combination of an exposure period and a diaphragm aperture on the first program response, as long as resulting exposure period and diaphragm aperture remain on the first program response, an exposure control value formed by a combination of the exposure period and the diaphragm aperture which results from the repeated shift operation is allowed to move along the first program response.

5. An apparatus for establishing a program exposure response of a camera, comprising:

a shift operating member;

first calculation means for calculating an EV value from the brightness of an object being photographed and a film speed;

first memory means for storing a constant of a program response which is used to determine a combination of an exposure period and a diaphragm aperture corresponding to an EV value;

second calculation means for calculating an exposure period and a diaphragm aperture on the basis of outputs from the first calculation means and the first memory means as a function of an exposure interlocked extent for the exposure period and the diaphragm aperture;

third calculation means for shifting an exposure period and a diaphragm aperture which are output from the second calculation means through a given number of steps in opposite directions in response to an operation of said shift operating member;

and fourth calculation means for calculating a constant of a program response which includes an exposure period and a diaphragm aperture which are output from the third calculation means and which is used to determine a combination of an exposure period and a diaphragm aperture corresponding to an EV value, and for causing the calculated constant to be stored in the first memory means in response to an operation of the shift operating member.

6. An apparatus according to claim 5, further including a gate for selecting between an output from the fourth calculation means and a given value and in which during an initial condition, the given value is selected for storage in the first memory means, and when an exposure period and a diaphragm aperture which are output from the third calculation means corresponds to one of such combinations which are based on the given value, the given value is selected for storage in the first memory means while an output from the fourth calculation means is selected for storage in the first memory means otherwise.

7. The apparatus of claim 5 wherein said fourth calculation means calculates differences in APEX values of exposure periods and diaphragm apertures and said first memory means stores the differences as a program response constant Px.

8. The apparatus of claim 5 wherein said fourth calculation means calculates a program response constant so as to include a combination of an exposure period and a diaphragm aperture which are predetermined and a combination of an exposure period and a diaphragm aperture which are outputs of said third calculation means and allows said first memory means to store the program response constant.

9. The apparatus of claim 5 wherein said program response has a range in which only a diaphragm aperture varies in response to a change in Ev value and said fourth calculation means allows said first memory means to store an exposure period in terms of the program response constant Px within the range.

10. A method for establishing a program exposure response for a camera having: photometry means for determining the brightness of an image to be photographed; memory means for storing a preset program representing the relationship between diaphragm aperture and exposure period values, which values vary in accordance with the preset program response dependent upon changes in the EV value, and a shift initiating member, said method comprising the steps of:

determining EV value as a function of the brightness value developed by the photometry circuit;

determining the diaphragm value and exposure period as a function of the EV value and the preset program value;

shifting the values of the diaphragm aperture and exposure period respectively in opposing direction for each operation of said shift member;

establishing a new program response as a function of the diaphragm aperture and exposure period established responsive to a shift operation; and determining the program response according to the shifted exposure period diaphragm aperture values.

11. The method of claim 10 wherein said camera storage means further stores the limiting upper and lower diaphragm aperture and exposure period values and further comprising the steps of:

comparing the shifted exposure period and diaphragm aperture values against the upper and lower limits and preventing the values compared with said limiting values to be changed whenever the shifted values exceed said limits.

12. The method of claim 10 wherein the step of determining the new program response further comprises generating a program response which a function of the ratio of the aperture diaphragm and exposure period values obtained as a result of the shift operations.

13. The method of claim 10 further comprising the step of determining the program response wherein the program response is substantially equal to the exposure period value obtained as a result of the shift operations.

14. The method of claim 10 wherein said second calculation means calculates an exposure period Tv in accordance with the equation:

$$Tv = \tfrac{1}{2}(Ev + Px)$$

where Tv=exposure period; $Ev = Bv + Sv$ and $Px = Tv - Av$ and BV=brightness; Sv=film sensitivity; Px=the prograam response and Av=lens diaphragm aperture.

15. A method of establishing a program exposure response of a cameraa having a shift operating member for shifting from a point along an existing program response contained in a memory to another point along another program response contained in the memory, the shift value and maximum and minimum lens diaphragm aperture values and film speed also being stored in the memory, comprising the steps of:

(a) obtaining and storing a brightness value of the image being photographed;

(b) determining the EV value based on the brightness value, the maximum aperture value and the film speed value;

(c) comparing the EV value calculated in step (b) with the minimum and maximum aperture values and shutter speed values stored in memory;

(d) setting the aperture and shutter speed values at the minimum values if the EV value is less than the lowest diaphragm aperture and shutter speed values;

(e) setting the aperture and shutter values equal to the maximum aperture and shutter values in the event that the EV value is greater than the maximum diaphragm aperture and shutter speed values;

(f) calculating the shutter speed value when the EV value lies between the maximum diaphragm aperture and shutter speed values and the minimum aperture and shutter values wherein the shutter speed value $TVs = \tfrac{1}{2}(EV + Px)$ wherein EV is the EV value calculated in step (b) and Px is the stored program response value stored in memory;

(g) determining the diaphragm aperture value AVx from the EV value calculated at step (b) and the shutter speed value calculated at step (f);

(h) setting the diaphragm aperture value at the minimum aperture value if the aperture value calculated at step (g) is less than the minimum diaphragm aperture value stored in memory;

(i) re-calculating the shutter speed value using the EV value and aperture values obtained at steps (b) and (h) respectively;

(j) setting the diaphragm aperture value at the highest aperture value stored in memory when the aperture value calculated at step (g) is greater than the highest diaphragm aperture value;

(k) recalculating the shutter speed value using the diaphragm aperture value established at step (j) and the EV value calculated at step (b);

(l) setting the shutter speed value at the lowest shutter speed value when the shutter speed value calculated at step (f) is less than the lowest shutter speed value stored in memory;

(m) calculating the diaphragm aperture value according to the EV value calculated at step (b) and the diaphragm aperture value established at step (k);

(n) setting the shutter speed value at the high shutter speed value stored in memory in the event that the shutter speed caiculated at step (f) is greater than the high shutter speed value stored in memory;

(o) re-calculating the diaphragm aperture value according to the EV value calculated at step (b) and the diaphragm aperture value determined at step (n).

16. The method and apparatus of claim 15 further comprising the steps of:

(p) comparing the diaphragm aperture and shutter speed values calculated at either steps (i) or (k) and at (m) or (o) with associated values stored in memory upon an upward shift request to determine if the shutter speed value is equal to or greater than the high shutter speed value stored in memory or if the diaphragm aperture value is equal to or less than the low diaphragm aperture value stored in memory;

(q) adding a predetermined value to said shutter speed value and subtracting the aforesaid predetermined value from said diaphragm aperture value when neither of the conditions of step (p) are present;

(r) establishing a program response by utilizing the aperture value and shutter speed values calculated at step (q); and (s) thereafter repeating steps (a) through (h).

17. The method of claim 16 further comprising the steps of:

(p) comparing the diaphragm aperture and shutter speed values with associated values stored in memory to determine if either the diaphragm aperture value determined at step (m) or step (h) is equal to or greater than the high diaphragm aperture value stored in memory or if the shutter speed value calculated at either step (i) or step (k) is equal to or less than the low shutter speed value stored in memory upon a down shift request;

(q) subtracting a predetermined value from said shutter speed value and adding the aforesaid predetermined value to the diaphragm aperture value when neither the aperture value nor shutter speed value are respectively equal to or less than or equal to or greater than the high diaphragm aperture value and low shutter speed value stored in memory; and (r) determining the program response based upon the shutter speed and aperture values calculated at step (q) and thereafter repeating steps (q) through (h).

* * * * *

UNITED STATES PATENT AND TRADEMARK OFFICE
CERTIFICATE OF CORRECTION

PATENT NO. : 4,745,428

DATED : May 17, 1988

INVENTOR(S) : Tetsuo Miyasaka

It is certified that error appears in the above-identified patent and that said Letters Patent is hereby corrected as shown below:

IN THE SPECIFICATION:

Column 1, line 47, after "steps" insert --required--.

Column 2, line 45, delete "a" (first and second occurrences).

Column 3, line 41, change "1/100" to --1/1000--.

Column 5, line 55, change "electromegnet" to --electromagnet--.

Column 5, lines 62 and 63, change "elelctromagnet" to --electromagnet--.

Column 7, line 2, insert -- $\overline{\text{shift register}}$ --.

Column 7, line 3, delete " $\overline{\text{shift register}}$ " and insert -- $Q^1\ Q^2\ Q^3\ Q^4\ Q^5\ \overline{Q^6\ Q^7\ Q^8\ AV_L}$ --.

Column 7, line 4, delete " $Q^1\ Q^2\ Q^3\ Q^4\ Q^5\ Q^6\ Q^7\ Q^8\ AV_L$ " and insert -- $Q^9\ Q^{10}\ Q^{11}\ Q^{12}\ Q^{13}\ Q^{14}\ Q^{15}\ Q^{16}\ AV_H$ --.

Column 7, line 5, delete " $Q^9\ Q^{10}\ Q^{11}\ Q^{12}\ Q^{13}\ Q^{14}\ Q^{15}\ Q^{16}\ AV_H$ ".

Column 11, line 45, change "so" to --as--.

Column 13, line 34, change "RAM" to --ROM--.

UNITED STATES PATENT AND TRADEMARK OFFICE
CERTIFICATE OF CORRECTION

PATENT NO. : 4,745,428
DATED : May 17, 1988
INVENTOR(S) : Tetsuo Miyasaka

It is certified that error appears in the above-identified patent and that said Letters Patent is hereby corrected as shown below:

Column 13, line 35, change "ROM" to --RAM--.

Column 15, line 42, change "RAMm" to --RAM--.

Column 16, line 29, change ">" to --$\leq$--.

IN THE CLAIMS:

Claim 3, Column 25, line 54, change "are" to --is--.

Claim 15, Column 27, line 42, change "cameraa" to --camera--.

Signed and Sealed this

Twelfth Day of September, 1989

Attest:

DONALD J. QUIGG

Attesting Officer

Commissioner of Patents and Trademarks